(12) United States Patent
Frame et al.

(10) Patent No.: US 6,252,627 B1
(45) Date of Patent: Jun. 26, 2001

(54) STAR TRACKER DETECTOR HAVING A PARTIAL MEMORY SECTION

(75) Inventors: Wayne Frame, Cedarridge; Thomas Bank; Richard Deters, both of Boulder, all of CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 09/383,060

(22) Filed: Aug. 25, 1999

(51) Int. Cl.$^7$ .................................................. H04N 5/335
(52) U.S. Cl. ............................................ 348/311; 348/314
(58) Field of Search ................................... 348/218, 294, 348/297, 298, 299, 311, 314, 315; H04N 5/335

(56) References Cited

U.S. PATENT DOCUMENTS

| | | | |
|---|---|---|---|
| 5,196,939 | * 3/1993 | Elabd et al. ........................ | 348/314 |
| 5,272,535 | 12/1993 | Elabd . | |
| 5,354,977 | 10/1994 | Ronstaei . | |
| 5,438,365 | * 8/1995 | Yamashita et al. ................. | 348/297 |
| 5,625,412 | 4/1997 | Aciu et al. . | |
| 5,668,597 | * 9/1997 | Parulski et al. ..................... | 348/350 |

OTHER PUBLICATIONS

"High Frequency Star Tracker", Ball Aerospace Systems Division, vol. I, P98–882, pp. 1–1 through 5–7, Sep. 4, 1998.
Proposal For "Star Sensor Prototype" (SSP), Ball Aerospace Systems Division, vol. I, P97–739, Feb. 1997.

\* cited by examiner

*Primary Examiner*—Tuan Ho
(74) *Attorney, Agent, or Firm*—Sheridan Ross, P.C.

(57) ABSTRACT

A tracker for stellar objects including stars is provided. The star tracker includes a charge coupled device having an image section and a memory section. The image section is useful in obtaining acquisition information related to determining the presence of one or more stars. The image section is also useful in obtaining location information useful in determining the position of each such star. The image section also obtains discardable information, such as information related to dark current and background star generated charge. The memory section receives the location or acquisition information from the image section. Such information is stored in significantly fewer lines and cells in the memory section than the number of lines from which such information was obtained in the image section. When storing location information in the memory section, at least one guard line can be provided intermediate the location information and the discardable information.

19 Claims, 18 Drawing Sheets

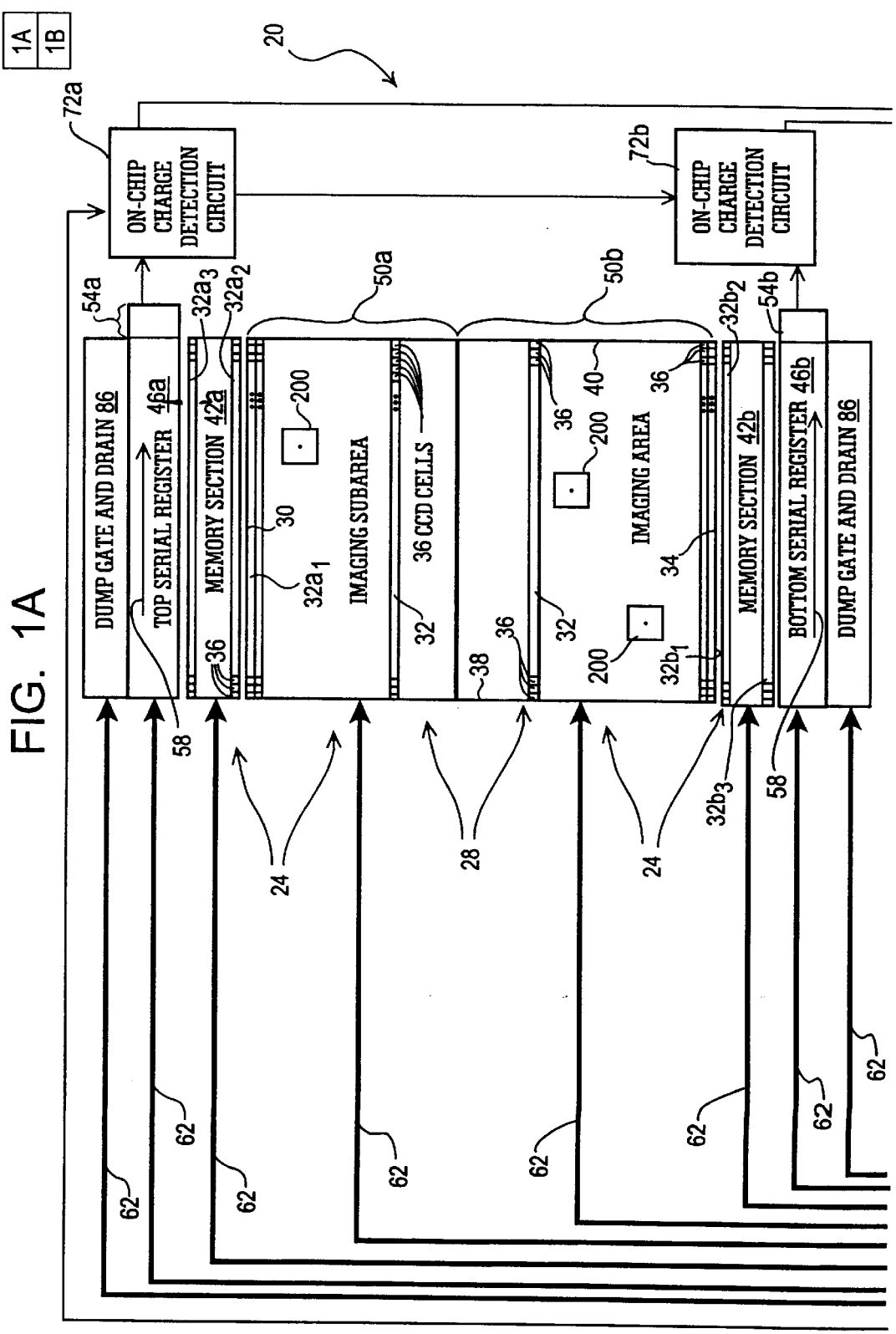

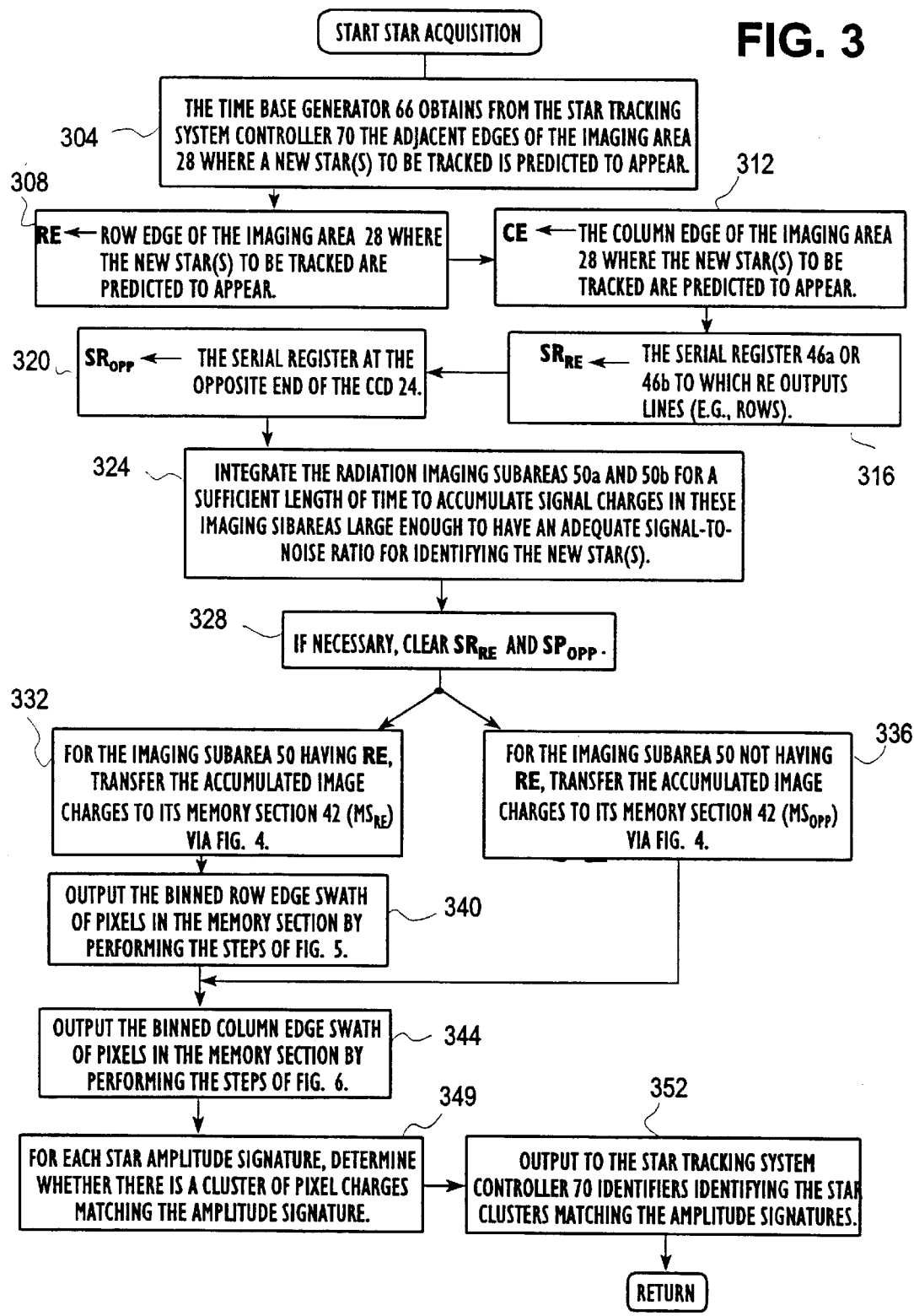

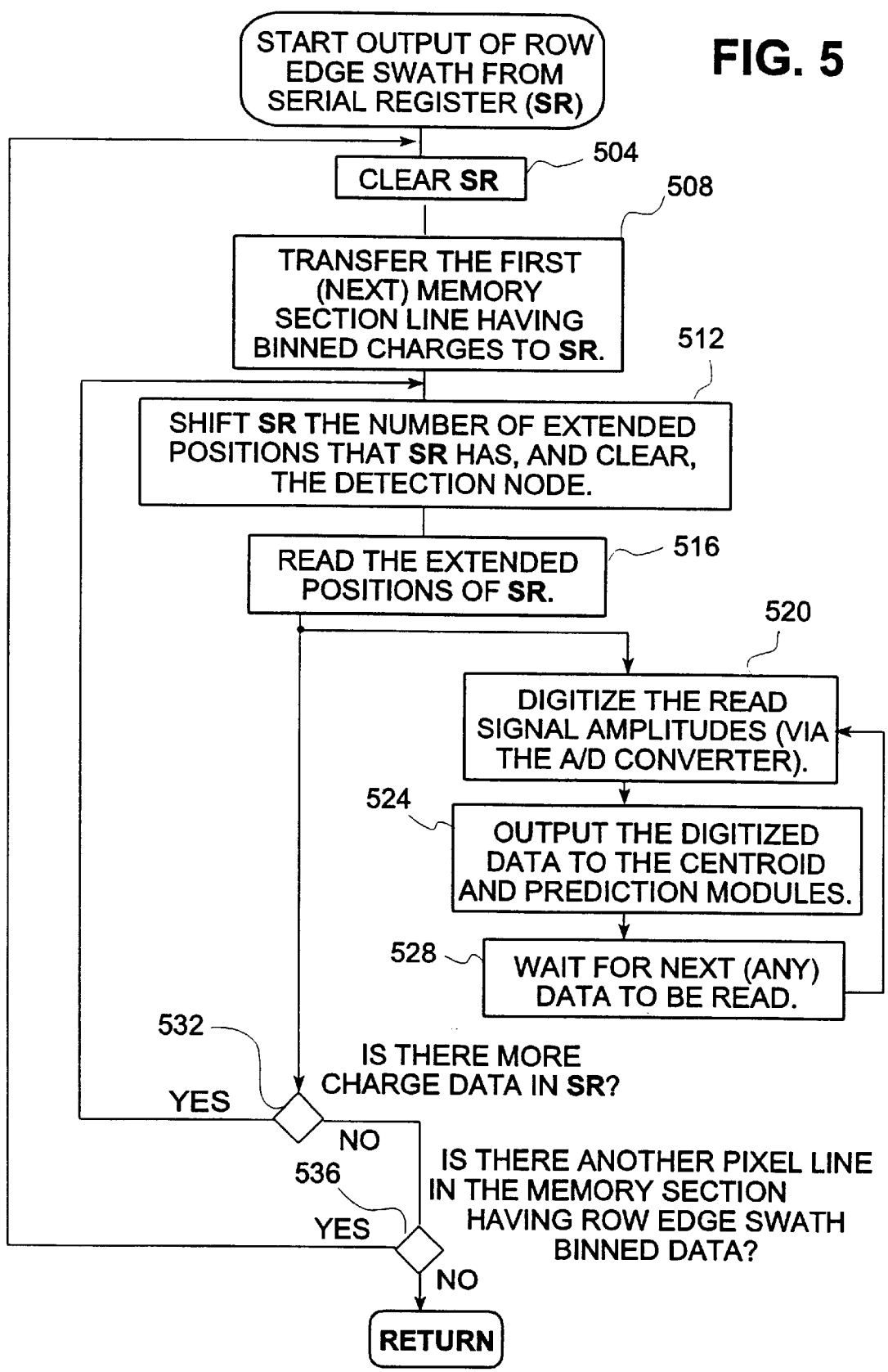

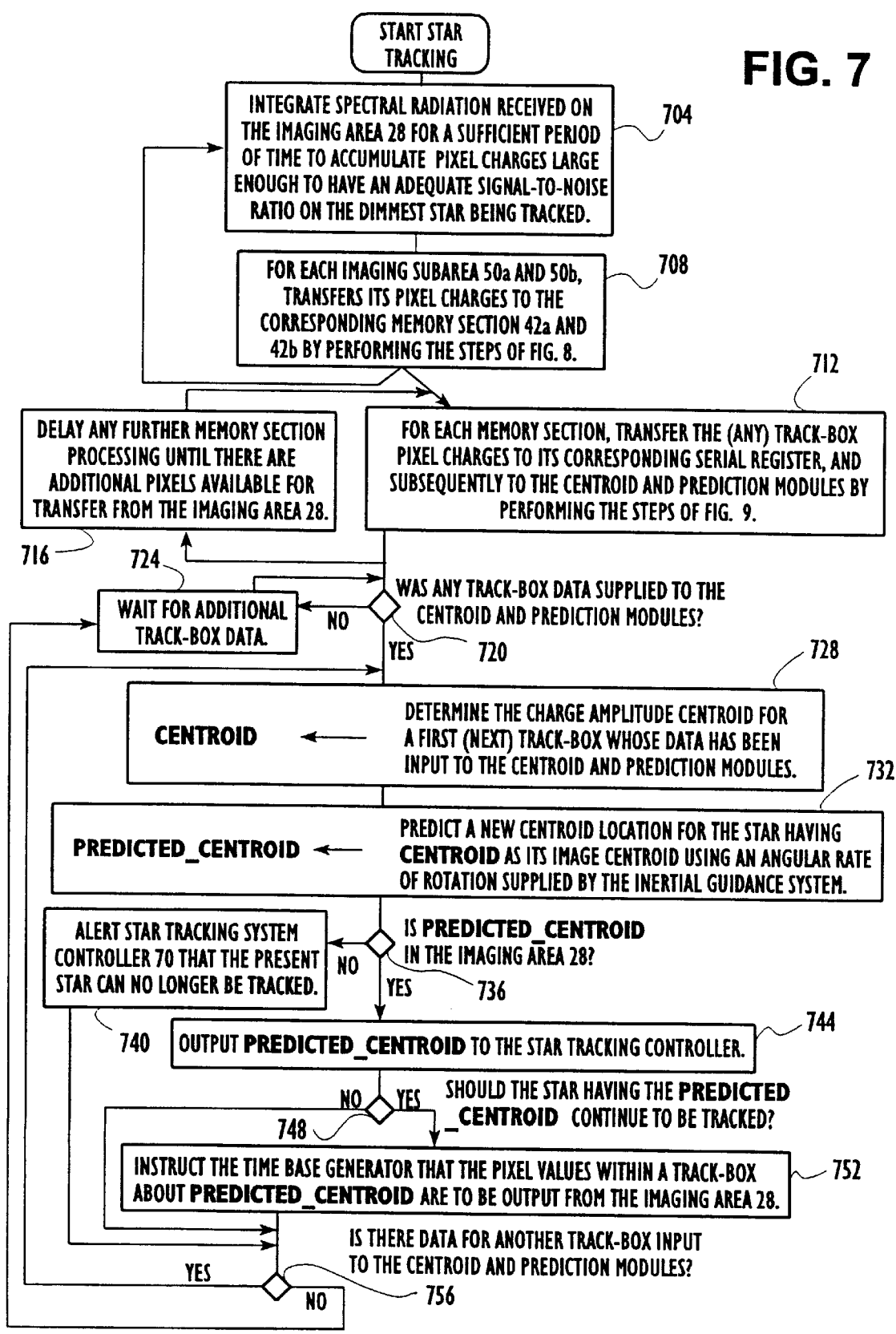

US 6,252,627 B1

STAR TRACKER DETECTOR HAVING A PARTIAL MEMORY SECTION

FIELD OF THE INVENTION

The present invention relates to obtaining information using a charge coupled device (CCD) and, in particular, obtaining location or acquisition information using one or more stars in which the CCD has a memory section that has fewer lines and cells than an imaging section thereof.

BACKGROUND OF THE INVENTION

In many aerospace related systems having orbiting space based satellites, the satellites must be in particular orientations to perform their intended tasks. For example, telecommunication satellites may require that their antennas are positioned for appropriate transmitting and receiving of wireless communications. Additionally, space exploration satellites may require very precise satellite orientation for high resolution imaging of celestial bodies. All inertial guidance systems drift with time and their calibration needs to be periodically updated. Reckoning from stars with a tracker can provide this calibration with the required precision.

A satellite's position and/or orientation may be determined by various types of inertial guidance systems such as a laser gyroscope. However, such inertial guidance systems are only useful for positioning and orienting an orbiting satellite up to a certain degree of accuracy. When further accuracy is desired, other techniques may be required. In particular, it would be desirable to enhance satellite position accuracy by using a real time star tracking system that tracks the images of predetermined stars. That is, such a star tracking system may be utilized to fine tune the position and/or orientation (collectively, denoted "positioning information") of an orbiting satellite, wherein a separate inertial guidance system supplies initial estimates of such positioning information. Moreover, when installed on a satellite, it would also be desirable for such a star tracking system to be of reduced size, weight and power consumption. Moreover, it would be also desirable that such a star tracking system be capable of tracking a plurality of stars simultaneously.

SUMMARY OF THE INVENTION

The present invention is a star tracker that includes a novel frame transfer CCD, wherein the memory section is substantially reduced in size, and further wherein there is only a minor increase in the parallel charge transfer inefficiency (CTI) over that of a full frame CCD. Moreover, the present invention allows high update rates (frame rates) with low actual pixel read rates and hence reduced bandwidth demands. Additionally, the present invention eliminates the perturbing influence of varying image smear on determining stellar image centroids by providing a substantially uniform smear under all star tracking scenarios. Also, the present invention reduces the image smear generating interval. Thus, the present invention provides high frame rates with low to moderate pixel read rates, and hence low bandwidths which translate to low noise levels, thereby making possible high signal-to-noise ratios. Further, the present invention generates only a small thermal load increase over that of a full frame CCD.

The tracking device of the present invention includes a novel charge frame transfer coupled device (CCD) having an imaging area for integrating (i.e., capturing) images thereon, and a reduced size memory section into which each such image is transferred and compacted therein. Subsequently, each image in the reduced memory section may be read out of the CCD and processed while a next image is being integrated in the imaging area. In particular, the novel CCD outputs the compacted image data from the reduced memory section to tracking modules for further processing so that stars may be accurately tracked by accurately generating centroids of their images.

The CCD included in the present invention is a frame transfer type having a split memory section. The split memory section has a first sequence of rows of charge collecting cells (CCD cells) for storing a first portion (e.g., an upper half) of an image obtained from a first part of the CCD imaging area. Note that this first sequence of rows are at a first (e.g., top) end of the CCD imaging area. Additionally, the memory section has a second sequence of rows of charge collecting cells at an opposite end of the CCD imaging area for storing a second portion (e.g. a lower half) of the image obtained from a second part (e.g., a lower half) of the CCD imaging area. In one embodiment, each of the memory section first and second portions contain half of the cell charges (i.e., pixels) collected in the CCD imaging area. Further, the rows of the CCD imaging area cells for the top half of the imaging area may be parallelly shifted into the first portion of the memory section, and the bottom half of the rows of the CCD imaging area may be parallelly shifted into the second portion of the memory section. Accordingly, it is an aspect of the present invention that by concurrently shifting each half of the imaging area into its corresponding portion of the memory section, the latency time for image transfers to the memory section is reduced from that of a CCD having a memory section at only a single end of the imaging area.

Although the total number of memory section charge cell rows for the present invention is substantially fewer in number than the number of such rows in the imaging area, the present invention is able to provide rapid transfer of an entire image from the imaging area to the reduced size memory section in a manner such that all the desired star tracking information within each image is preserved in the reduced size memory section. That is, all such desired star tracking information can be represented within a reduced size memory section since typically: (a) only a small number of stars are simultaneously tracked (e.g., less than or equal to 4), and (b) each star's image lies within, for example, a relatively small square (also denoted "track-box") of charge collecting cells of the imaging area (i.e., such a track-box is "small" compared to the total size of the imaging area). Thus, by coalescing (or "binning" as it is referred to in the art) rows of image charges that do not intersect such track-boxes, a substantially reduced memory section becomes adequate for the star tracking task. That is, the present invention shifts images from the imaging area into the memory section while concurrently: (a) binning the rows of pixels (denoted also "pixel lines") not intersecting any track-box, and (b) not binning image area pixel lines that intersect at least one track-box. Moreover, the reduction in the memory section has the added benefit that the charge transfer inefficiency (CTI) of the CCD is reduced in that each charge (i.e., pixel) is transferred a reduced number of times in comparison to a memory section that is substantially the same size as the imaging area.

Additionally, it is an aspect of the present invention to include modules for generating one or more "guard" lines of pixels between each binned pixel line and each non-binned pixel line in the memory section, wherein such guard lines are intended to have relatively little charge therein and therefore function as insulators for inhibiting the charge leakage between binned and non-binned lines in the memory section by providing a place to accumulate dark current and any other background signal charge.

It is a further aspect of the present invention that during the tracking of stars, there are one or more modules provided for both determining a most recent centroid of each star image being tracked, and predicting a subsequent most likely centroid for each such star image. In fact, such predicted centroids are used to determine (the centers of) subsequent track-box positions in a next image integration. Further, note that such track-box prediction modules may require position, orientation and angular rotation rate information from the satellite in which the present invention is incorporated to correctly predict where new star image centroids are likely to be.

When a star tracker according to the present invention is operating above the earth's atmosphere, almost all of the field of view (FOV) is substantially dark with the exception of a few stellar images that are sufficiently bright so that they can be tracked. It is common for CCDs to generate what is known as "dark current" which is noise that can detract from accurately identifying and/or determining the position of stellar images. For example, if the average dark current level is 100 electrons per CCD cell, the added noise is the square root of 100, i.e., 10 electrons. This noise decreases the overall signal-to-noise ratio for stars being tracked. The average dark current is accumulated at a constant rate above the earth's atmosphere. Thus, this dark current is substantially a function of the CCD exposure or integration time, and readout times, as one skilled in the art will understand. Further, the dark current rate is strongly dependent on the CCD temperature. Thus, cooling a CCD serves to reduce the influence of the dark current. Additionally, within the CCD structure, the discontinuity of the crystal lattice at the silicon-silicon dioxide interface is also a major contributor to the overall dark current, as one skilled in the art will understand. It is, thus, common practice to "tie-up" dangling silicon lattice atom bonds with a hydrogen annealing process as one skilled in the art will understand. Moreover, it is well known that exposure to high energy particle radiation, particularly protons, such as encountered in space, increases the dark current generation rate. It is believed that such radiation partially reverses the effect of hydrogen annealing. Accordingly, the dark current level at the end of a CCD's useful life must be accommodated for in the design of a star tracker.

When transferring an image from the imaging area to the memory section in a CCD according to the present invention, there will be many more parallel charge shifts than there are corresponding shifts in the reduced memory section. Thus, most of the generated dark current and background stellar generated charge initially occurs in the imaging area, and is driven toward one of the interfaces with the memory section during transfer thereto. Since one embodiment of the CCD provided by the present invention utilizes a three phase clocking structure (i.e., there are three parallel clocking electrodes per row of charge cells), if each memory section cell row that is an interface to the imaging area has its first memory phase electrode always "parked" at the high clock potential level, each such interface cell row acts as an accumulator that can collect a plurality of consecutive rows of image charges (also denoted "pixel lines") of such dark current and stellar background noise. Such summing of charges is also denoted herein as "binning." Thus, as mentioned hereinabove, a few "extra" cell rows in the memory section in addition to those needed to accommodate the track-box(es) are used to collect the dark current and undesired background signal. Further, the dark current and undesirable background signals can be divided between more than one consecutive pixel line if so needed. Thus, the number of cell rows in the memory section is dependent upon: (a) the dimensions of the track-boxes, (b) the number of stars to be simultaneously tracked (i.e., the number of track-boxes), (c) the total number of pixel lines used for binning, and (d) the total number of guard band lines needed to insulate the track-box images in the memory section from one another and/or from pixel lines used for binning (i.e., having accumulated dark current and background noise).

Various design considerations and/or operating constraints may be provided for the manufacturing of the present invention. In particular, the exposure time for the imaging area to capture an image must be set so that there is sufficient time to accumulate enough signal charge to achieve an adequate signal-to-noise ratio on the dimmest star to be tracked. Additionally, the amount of exposure time is also dependent upon the high dynamics of satellite roll, pitch and yaw, since such movements result in image smear which can result in unacceptable centroiding error, if the exposure time is too long. A reasonable rule of thumb in determining exposure time for the present invention is that no star image in the imaging area be allowed to move more than its width in any given exposure time. However, note that the width of such star images may be artificially increased in the present invention by utilization of a defocusing lens which slightly defocuses stellar light onto the imaging area. Note that such defocusing has been found to facilitate angular interpolation so that sub-pixel accuracy of star image centroids can be obtained.

Another design decision to be determined when manufacturing the present invention has to do with purging the memory section of pixel lines that do not contain useful data. In particular, even though the images are compressed into a reduced number of pixel lines in the memory section, many of these lines do not contain useful data. However, each such pixel line of the memory section must be either read out or somehow purged. Purging can be accomplished in one of two ways. In a first way, the pixels not useful for determining star image centroids are transferred to one of the pixel read out serial registers, also included in the present invention, and subsequently the unuseful pixels are clocked to a charge detection node for purging. In a less standard second way, such purging is performed via a "dump drain" connected to each such serial register. Thus, by "opening" a dump gate and transferring the unnecessary pixels from the memory section to a serial register, the pixels are automatically dumped into the dump drain. However, this second way comes at a price since one preferred embodiment of the present invention includes serial registers that are three-phased (as one skilled in the art will understand), three layers of polysilicon are used in the manufacturing process. However, in providing a dump gate, a fourth polysilicon layer is required, and such a layer is not standard in the electronics industry. Additionally note that a fast purge of unused pixels can be accomplished by holding a reset transistor at the detection node in an "on" state, and fast shifting the connected serial register if there is no dump drain, as one skilled in the art will understand.

In addition to tracking objects such as stars, the present invention also includes novel techniques for acquiring or identifying new star images to be tracked. In particular, the present invention anticipates or predicts which stars designated for tracking are likely to be imaged on the CCD imaging area, and subsequently switches to a "star acquisition" mode wherein only imaging area cells in swaths along certain edges of the imaging area are processed for determining whether a candidate star for tracking is detected. Accordingly, one embodiment of the present invention includes a star database for storing the locations of stars to be tracked along with a radiation "signature" of each such star. Thus, once a star tracking controller for the present invention receives (from, e.g., an on-board satellite inertial guidance system) position, orientation and angular rotation rate information, the star tracking controller is able to interrogate the star database for any candidate stars for tracking that are likely to be detected along an edge of the CCD imaging area. Accordingly, the processing performed during the star acquisition mode can be performed efficiently since swaths of cells along only two edges of the (rectangular) imaging area need be processed and the remainder of the imaging area ignored.

Other features and benefits of the present invention will become evident from the accompanying drawings and detailed description herein below.

BRIEF DESCRIPTION OF THE DRAWINGS

FIGS. 1A and 1B jointly provide a diagram illustrating the components of the star tracking system of the present invention.

FIG. 3 is a high level flowchart of the steps performed during the acquisition of new star images to be tracked.

FIG. 5 is a high level flowchart of the steps performed when outputting, from one of the portions of the split memory section to its corresponding serial register, pixel lines from along an edge of the imaging area during the acquisition mode for acquiring new star images to be tracked.

FIG. 7 provides a high level flowchart for tracking a star image according to the present invention.

DETAILED DESCRIPTION

Figure 1B:
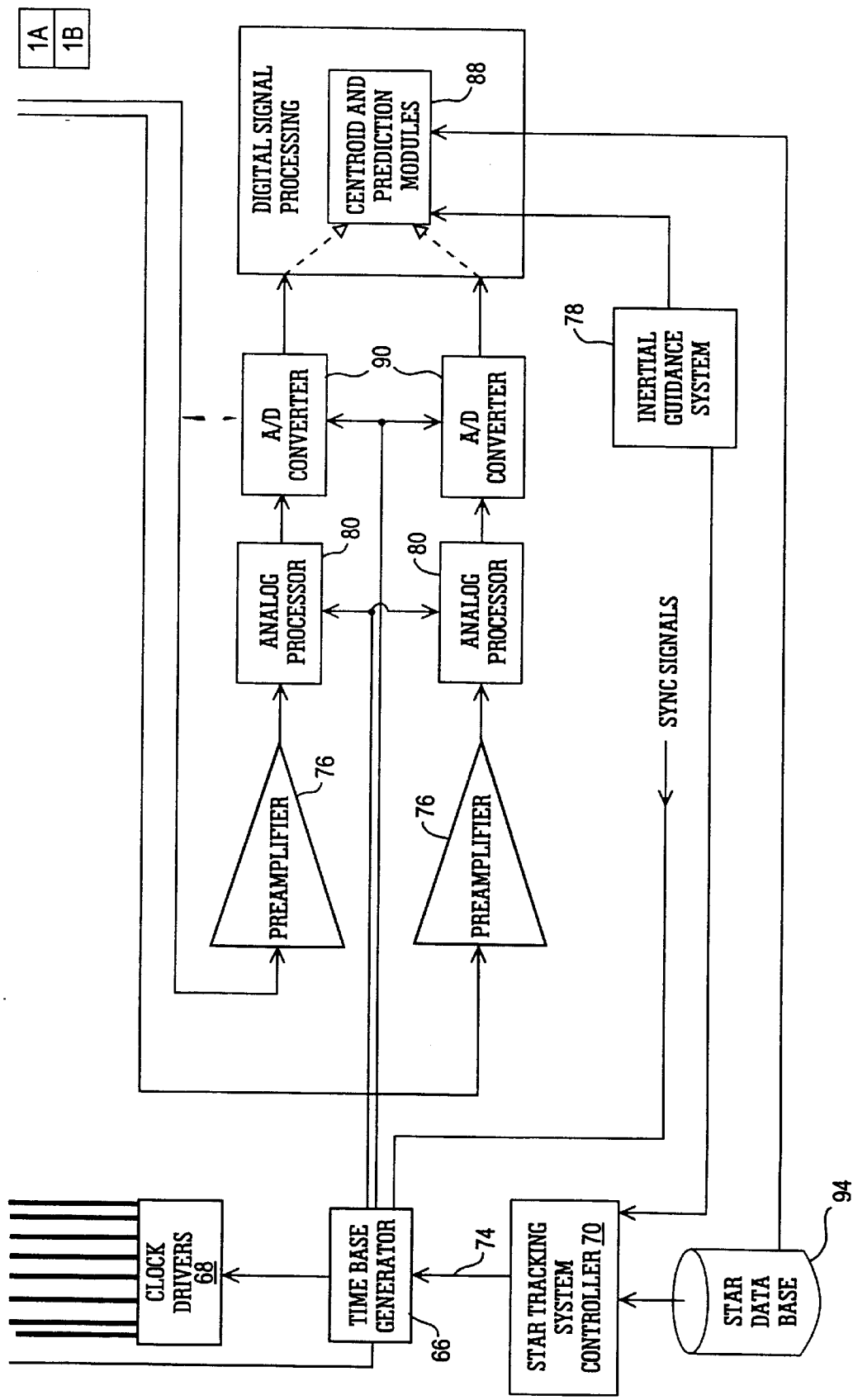

In the block diagram of FIGS. 1A and 1B, the high level components of the novel star tracker 20 of the present invention are shown. The star tracker 20 includes a charged coupled device (CCD) 24, wherein the CCD 24 includes the following subcomponents (a) through (c):

(a) A CCD imaging area 28 for collecting electrical charges corresponding to images to which the imaging area 28 is exposed. As one skilled in the art will understand, the imaging area 28 includes an array of photo-active charge collecting cells 36 (herein also denoted CCD cells), wherein each CCD cell 36 retains an electrical charge (each such charge also denoted a "pixel charge" or simply "pixel") that is indicative of the spectral radiation contacting the CCD cell. In one embodiment, each such cell 36 is approximately 15 microns by 15 microns, and the imaging area 28 is a cell array having 512 cell rows 32, with each such row 32 having 512 CCD cells.

(b) A memory section having two separate portions thereof, namely, memory section 42a and memory section 42b. These memory sections 42a and 42b each have a plurality of cell rows 32 used as temporary storage for images that have been first captured or integrated on the imaging area 28 and then subsequently transferred into the memory sections 42a and 42b, as discussed hereinbelow. The total number of cell rows 32 of the memory sections 42a, 42b is significantly less than the total number of cell rows or lines 32 of the imaging area 28. The total number of cell rows 32 of the memory sections 42a, 42b is preferably less than 50% of the total number of cell rows 32 of the imaging area 28 and is typically less than 75%–90% and can be less than 90%.

(c) A pair of serial registers 46a and 46b, wherein each of these serial registers receives pixel charges from an adjacent line of the memory sections 42a and 42b. Thus, serial register 46a receives such pixel charge data from memory section 42a, and serial register 46b receives such pixel charge data from memory section 42b. The extended cells 54a, 54b of serial registers 46a, 46b are used to gain physical room for needed electrical connection to such functions as the on-chip charge detection circuits 72a, 72b as well as memory sections 32a, 32b clock electrodes.

Regarding imaging area 28, this area has been electronically configured so that a first or top imaging subarea 50a is such that pixel charges in the cell rows 32 of this imaging subarea can be electrically shifted synchronously toward the memory section 42a when an image is to be transferred out of the imaging subarea 50a. Accordingly, the pixel charges in the CCD cells 36 of cell row $32a_1$, of the imaging subarea 50a are transferred into corresponding CCD cells 36 of cell row $32a_2$ of the memory section 42a when there is a shift of cell rows 32 synchronously toward the memory section 42a. In particular, by denoting the pixel charges within any single cell row 32 as a "pixel line," the pixel lines within imaging subarea 50a are capable of being synchronously shifted toward the memory section 42a. Correspondingly, the imaging area 28 is also configured so that a second or bottom imaging subarea 50b of cell rows 32 synchronously' shifts pixel lines therein toward memory section 42b, wherein with each synchronous shift of pixel lines, the charges in cell row $32b_1$, of the imaging subarea 50b are transferred into the cell row $32b_2$ of the memory section 42b.

Note that in one embodiment of the imaging area 28, each of the top and bottom imaging areas 50a and 50b have 256 cell rows 32 with 512 CCD cells 36 per row. Accordingly, assuming the top and bottom imaging areas 50a and 50b are electronically activated to concurrently transfer their pixel lines into their corresponding memory sections 42, the imaging area 28 can be completely transferred into the memory sections 42 in the time required for 256 pixel line shifts.

Regarding the memory sections 42a and 42b, each of these memory sections has a fewer number of cell rows 32 than the number of cell rows in the corresponding imaging subarea whose pixel charges are transferred therein. In particular, assuming that each imaging subarea 50a and 50b has 256 cell rows 32, one embodiment of the present invention has 32 cell rows 32 for each of the memory sections 42a and 42b. In particular, with 32 cell rows, each memory section 42 is able to store two (non-compacted) 12 by 12 track-boxes along with one or more insulating pixel lines (denoted "guard band lines"), for insulating each such track-box from other memory section pixel lines, as will be discussed further hereinbelow. Thus, in comparison to a full frame CCD, the CCD provided by the present invention requires only a slight increase in the parallel CTI as a result of the 32 more parallel cell row shifts required for reading (via the serial registers 46). Accordingly, a maximum of 256+32 (=288) parallel shifts are required for reading the entire imaging area 28. However, note that it is within the scope of the present invention for each of the memory sections 42 to have either a greater or lesser number of cell rows 32. In particular, the number of cell rows 32 in each memory section 42 is dependent upon the number of star images to be tracked simultaneously as will be discussed hereinbelow.

Regarding the serial registers 46a and 46b, the corresponding adjacent memory section cell rows $32a_3$ and $32b_3$, have their pixel charges transferred into corresponding CCD cells 36 in the adjacent serial register 46a and 46bAdditionally, note that each of the serial registers 46a and 46b has an extended portion 54a and 54b, respectively, wherein when the pixel charges within the serial register are shifted (in the direction of arrows 58) into the corresponding extended portion 54, these pixel charges (or, their corresponding signal amplitudes) may be output to additional components of the star tracker 20.

Note that in one embodiment of the CCD 24, the imaging area 28, the memory sections 42 and the serial registers 46 are adjacent to one another on a single silicon chip having rows of electrodes (not shown) parallel to the cell rows 32 and extending therethrough for-both insulating charges in individual CCD cells 36 from one another and for parallelly transferring pixel lines as one skilled in the art of CCD technology will understand. In particular, since the present embodiment of the CCD 24 is a three phase charge coupled device, each of the imaging subareas 50a, 50b, and the memory sections 42a and 42b have three control lines (each set of three control lines being identified by one of the bold lines 62 in FIG. 1) for providing electrical potentials thereon according to output by a time base generator 66 via the clock drivers 68. That is, the time base generator 66 outputs control signals to the clock drivers 68 and these drivers output corresponding signals on the control line sets 62 for controlling the shifting of pixel lines in the imaging area 28 and the memory sections 42a and 42b. Thus, the time base generator 66 orchestrates operation of the CCD 24. In particular, the time base generator 66 controls all parallel and serial shifting, as well as purging, dumping and signal reading. To accomplish this, command and control information is provided to the time base generator 66 from a star tracking controller 70 (described hereinbelow) which is either internal or external to the star tracker 20. For example, the star tracking controller 70 issues track-box location information to the time base generator 66. Additionally, note that clock driver circuits 68 provide level translation and the needed current source and sink capability to drive the CCD 24 clocking electrodes (not shown). Further, to achieve low read-out noise, on-chip charge detection circuits 72a and 72b are utilized to receive output charges from the extended portions 54 of the serial registers 46. Such on-chip charge detection circuits 72 typically include a floating diffusion (not shown), and each such circuit is also referred to herein as a detection node and reset transistor combination, as one skilled in the art will understand. Note that such a floating diffusion provides a small electrical capacitance on the order of 0.5 e-14 Farads, which is used to convert signal charge to voltage according to the following formula: $V=q/c$, A as one skilled in the art will understand. Thus, 0.5 e-14 Farads translates to 3.2 micro-volts per electron. Note that the reset transistor is used to reset a capacitor within the detection node to a known potential after each pixel read, thereby readying the detection node for the next charge received from its corresponding serial register 46. Additionally, note that a single or multiple stage source follower (also not shown) with a gate from control transistor connected to the floating diffusion serves to drive the off-chip load. Further, an off-chip pre-amplifier 76 provides voltage gain to. the output received from one of the on-chip charge detection circuits. Typically, such a pre-amplifier 76 is followed by an analog signal processing circuit 80 such as a correlated double sampler (CDS) circuit. Accordingly, such an analog processor circuit is used to mitigate the uncertainty of the reset transistor, thus lowering read out noise, as one skilled in the art will understand. Finally, the analog signal voltage output by each circuit 80 is subsequently converted to a digital signal by a corresponding A/D converter 90, and the output from each such converter provides an adequate number of bits to handle the dynamic range of expected values, and provide a sufficiently low quantization noise level.

As mentioned hereinabove, the star tracker 20 also includes a star tracking system controller 70 for controlling the operation of the star tracker 20. In particular, the star tracking controller 70 outputs the command and control signals, via control line 74, to the time base generator 66 regarding how the pixel lines in cell rows 32 are to be shifted and/or binned. In particular, the star tracking system controller 70 issues commands for the time base generator 66 to switch between a first mode of acquiring new star images to be tracked, and a second mode of continuing to track star images that have been previously acquired. Additionally, the star tracking controller 70 receives, from an inertial guidance system 78, orientation information (including angular rotation rates) of a satellite containing the star tracker 20. Note that the inertial guidance system 78 can have various embodiments (as one skilled in the art will understand); e.g., it may be a laser based gyroscope. However, such inertial guidance systems 78 have a limited precision that is insufficient for highly precise alignment of the satellite wherein, for example, the satellite maintains a particular orientation toward the earth or another celestial body. Thus, the present invention detects smaller satellite movements, and can accordingly be used for better satellite alignment.

The star tracking system controller 70 also controls a component (denoted the centroid and prediction modules 88) having a plurality of computational modules for determining the centroid of each star image being tracked, and also for determining a predicted location where each star image is likely to be located in a future image integrated on the imaging area 28.

Additionally, the star tracking system controller 70 receives star location information from a star database 94. In particular, when the star tracking system controller 70 receives satellite orientation information from the inertial guidance system 78, the star tracking system controller is able to interrogate the star database 94 for retrieving the identities of stars that are likely to come into view on the imaging area 28 given the satellite's orbital motion and angular rotation rates, such as row, pitch and yaw. Thus, the star tracking controller 70 can use such star location information for determining when to direct the time base generator 66 to switch between the star tracking mode and the star image acquisition mode.

There are two basic modes for the operation of a star tracker 20 according to the present invention, i.e., a tracking mode and an acquisition mode. The acquisition mode is used to either find and/or confirm where, at any particular time interval, a track box(es) in the FOV should be located, whereas the tracking mode is used to determine a precise new location of a previously located star image (and/or the track-box containing the star image). To enhance overall understanding of the present invention, flowcharts for the steps performed with specific track-boxes will first be given, then more general descriptions will follow. Further, since description of the tracking mode may be easier to follow, the flowchart of FIG. 10 for a specific example of the star tracking processing will be described first. Subsequently, a description of the flowchart of FIG. 11 for a specific example illustrating the acquisition mode will be provided. Following these two example flowcharts, more general flowcharts (FIGS. 2 through 9) describing the control processing, the tracking processing and the acquisition processing are provided.

For illustrating the tracking mode, consider the following scenario. Assume the CCD 24 is a split frame device having an imaging area 28 that is 512 by 512, and two memory sections 42a, 42b that are each 32 by 512 and positioned relative to the imaging area 28 as shown in FIG. 1. Also assume that there are two star images detectable in the bottom imaging area 50b, one centered at the cell of row 100, column 80, and another centered at the cell of row 200, column 250. Further, assume that there is a track-box 200, respectively, about each of these star image centers, wherein each track-box is an array of 12 by 12 cells 36 (approximately as shown in FIG. 1). Given this scenario, the flowchart of FIG. 10 describes the tracking processing performed regarding the portion of an image captured in the imaging subarea 50b. However, it is important to note that each of the steps of FIG. 10 equally well apply to the imaging subarea 50a. Further, note that in one preferred embodiment of the present invention, the steps performed for images integrated in 50b are performed in parallel with those images integrated on imaging subarea 50a. Thus, for each step performed in the flowchart of FIG. 10, there is a corresponding step applicable to the imaging subarea 50a, memory section 42a, serial register 46a and on-chip charge detection circuit 72a. Accordingly, FIG. 10 commences with a step 1004, wherein star image signals are integrated onto the imaging subarea 50b an effective time for providing an adequate signal-to-noise ratio on the dimmest star image being tracked and/or so that an amount of image smear during transfer to the memory section 42b does not substantially affect the signal-to-noise ratio.

Subsequently, in step 1008, the time base generator 66 provides control signals, via the clock drivers 68, to the imaging subarea 50b for parallelly shifting the first (lowest) 95 pixel lines into the first row $32b_2$ of the memory section 42b. Note that the resulting pixel line (as well as other pixel lines similarly created) is referred to hereinbelow as an "accumulator line". Subsequently, in step 1016, the memory section 46b is shifted to thereby provide guard band lines as described previously. Then, in step 1020, pixel lines originally in rows 96 through 106 are shifted into the memory section 46b so that the first track-box 200 is provided in the memory section 46b full size. Following this, in step 1024, the memory section 46b is shifted independently of the imaging area 46b, thereby providing additional guard band lines. In step 1028, pixel lines originally in rows 107 through 194 of the imaging subarea 50b are transferred into the first row $32b_2$ of the memory section. Following this, in step 1032, the memory section 46b is shifted to provide additional guard band lines. In step 1036, the pixel lines originally in rows 195 through 206 of the imaging subarea of 50b are parallelly shifted into the memory section 46b, wherein the second track-box 200 is provided in the memory section 46b full size. Following this, in step 1040, additional guard band lines are provided, and subsequently, in step 1044, the remaining pixel lines originally obtained from rows 207 through 256 of the imaging subarea 50b are transferred into the first row $32b_2$. In step 1046, the pixel lines of the memory section 42b between the first track-box 200 (within this memory section) and the serial register 46b are clocked into this register and subsequently flushed or dumped without further processing. Subsequently, in steps 1050 through 1058, the pixel lines having portions of the first track-box 200 are iteratively read into the serial register 46b, and the 12 pixels of each pixel line that are also contained in this first track-box 200 are read (from the serial register and through the extended portion 54b) by the on-chip charge detection circuit 72b while the remainder of the pixels of each of these pixel lines are discarded by flushing or dumping. Subsequently, in step 1060, the next consecutive set of pixel lines not having pixels in a track-box 200 (i.e., guard band lines and an accumulation line) are now flushed or dumped. In step 1064, the steps 1050 through 1060 are repeated for reading the pixels of the second track box 200 and purging all other pixels in the memory section 42b. Thus, the memory section 42b is now clear of pixel charges, and can accept another frame of pixels from the imaging subarea 50b. Subsequently, in step 1072, the flow of control is transferred back to step 1004 for repeating these steps with another image.

A description of a specific example of the processing performed during the star imaging acquisition mode will now be provided. Note that the motion of a satellite or spacecraft containing an embodiment of the present invention is continually bringing candidate star images into the field of view (FOV) of the imaging area 28. In particular, motion of the satellite or spacecraft results from orbital dynamics and can be complicated by roll, pitch and yaw. In fact, the roll, pitch and/or yaw of the satellite or spacecraft may be purposely induced to keep one or more on-board instruments pointed at a particular object, or to acquire sightings of a particular celestial object. Since such motions can be at least roughly measured by the inertial guidance system 78 (FIG. 1), star images that are candidates for being tracked will enter the field of view of the imaging area 28 along one of its leading edges in the direction of movement. Accordingly, to determine if star images entering the field of view have recognizable spectral signatures, an integrated image need only be analyzed along swaths of the leading edges of the imaging area 28 for identifying trackable star images. Moreover, assuming the satellite or spacecraft has not lost its bearings, a candidate star image's "point of entry" in the field of view can be anticipated by using the star database 94 (FIG. 1) that associates star image spectral characteristics with celestial locations. Note that satellite or spacecraft motion will typically not be aligned with a predetermined geometric axis for the star tracker of the present invention, and therefore, two adjacent leading edges are used for acquiring newly entered field of view star images. For example, the bottom and right edges of the imaging area 28 could constitute leading edges for a particular movement of the satellite or spacecraft containing the present invention.

Accordingly, when searching for candidate star images, pixels within swaths along the leading edges need only be analyzed for such star images. Moreover, for each swath, its dimension perpendicular to the swath's associated leading edge needs to only span a sufficient number of charge cell 36 rows and/or columns so that a candidate star image's motion can be captured within a few frame integration times. Thus, it is an aspect of the present invention that most of the imaging area 28 can be ignored in the acquisition mode. Furthermore, since high precision centroiding is not required in the acquisition mode, pixels obtained for use in acquisition analysis may be binned into super-pixels of 2 by 2, 4 by 4, or 8 by 8 pixels, thereby to increase the pixel read rate during acquisition mode.

Figure 11A:
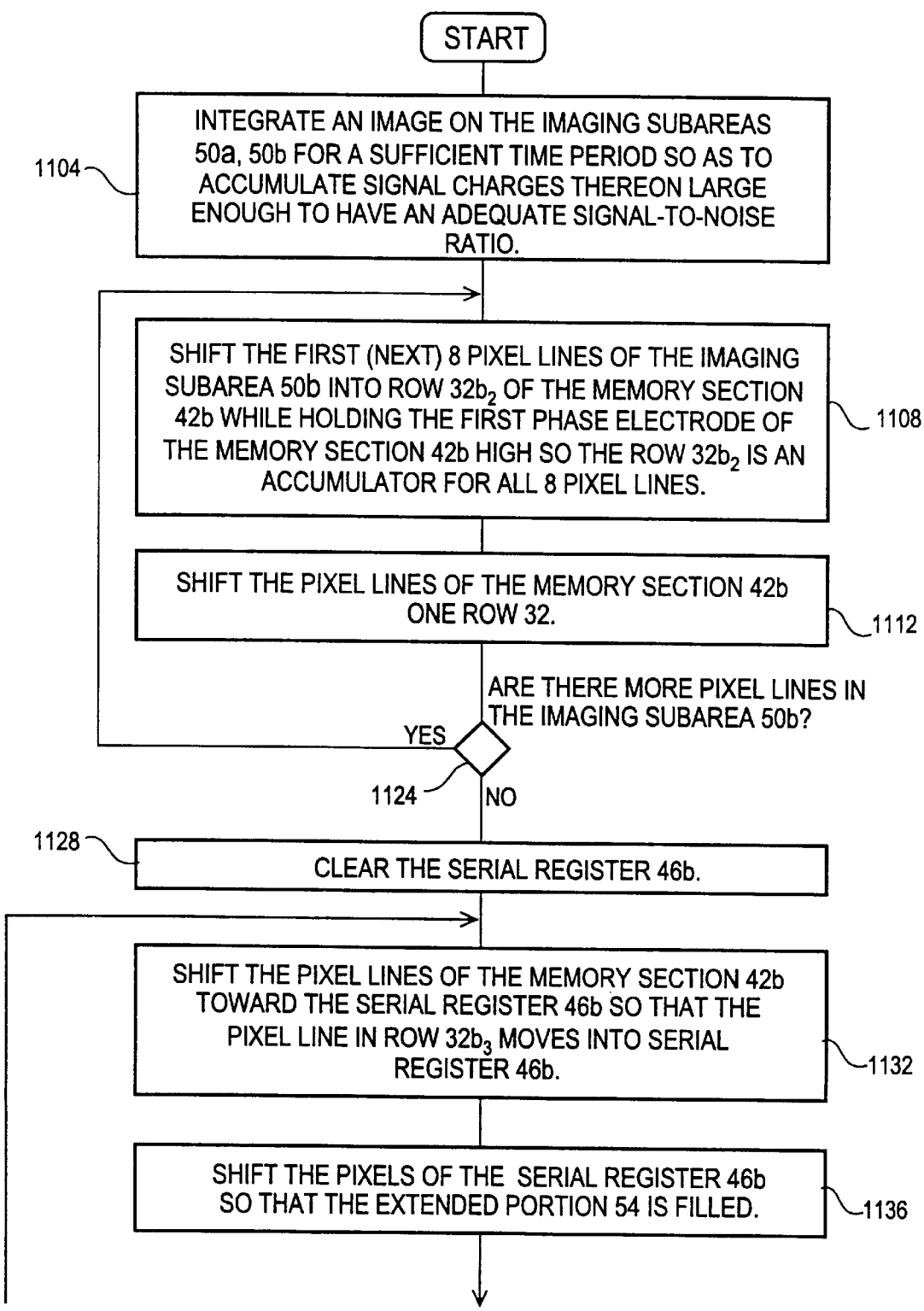
FIGS. 11A through 11C provide an exemplary flowchart illustrating the steps performed by the present invention during star image acquisition mode, wherein a particular orientation of the present invention is assumed relative to star images that move into the field of view.
Figure 11B:
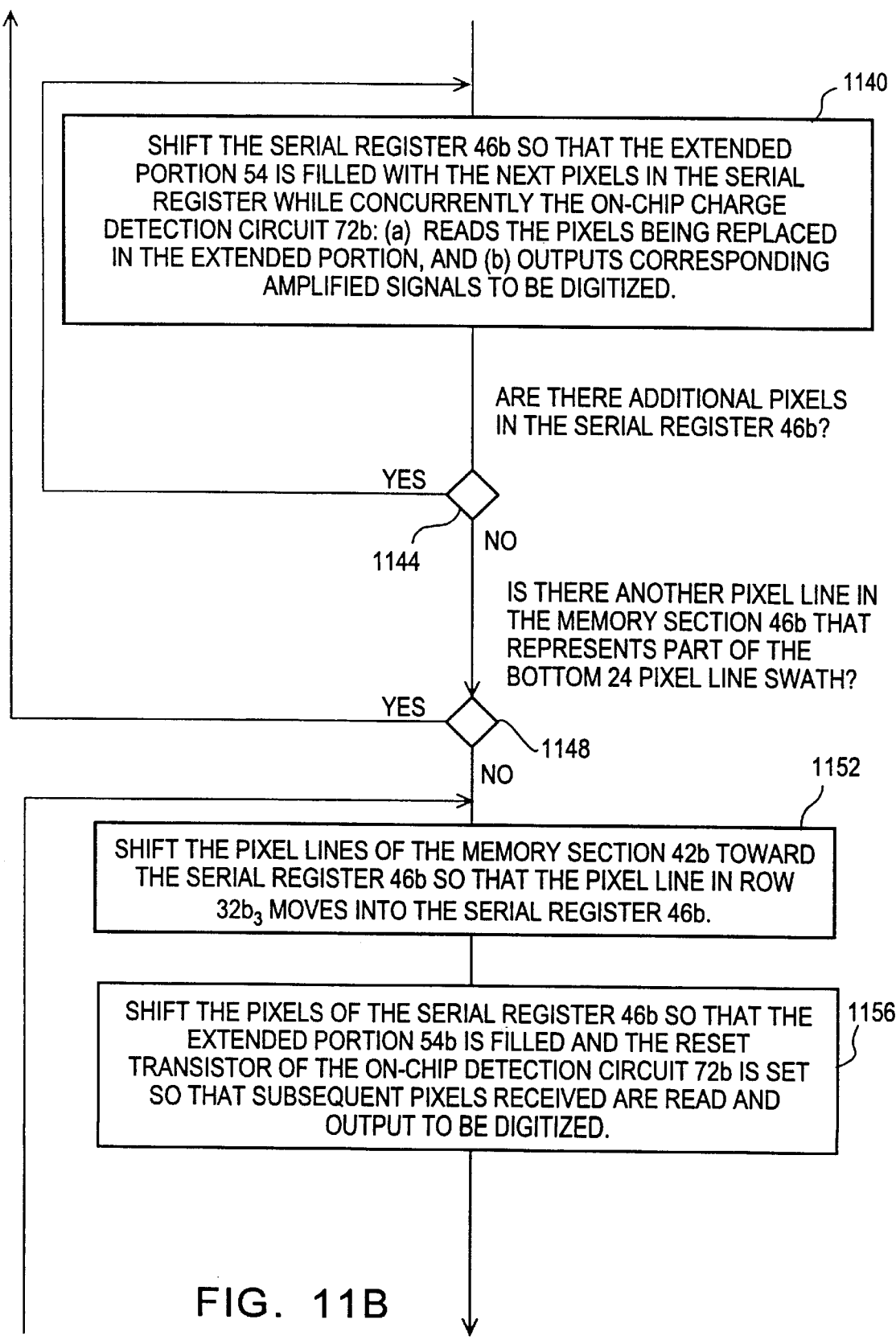
Figure 11C:
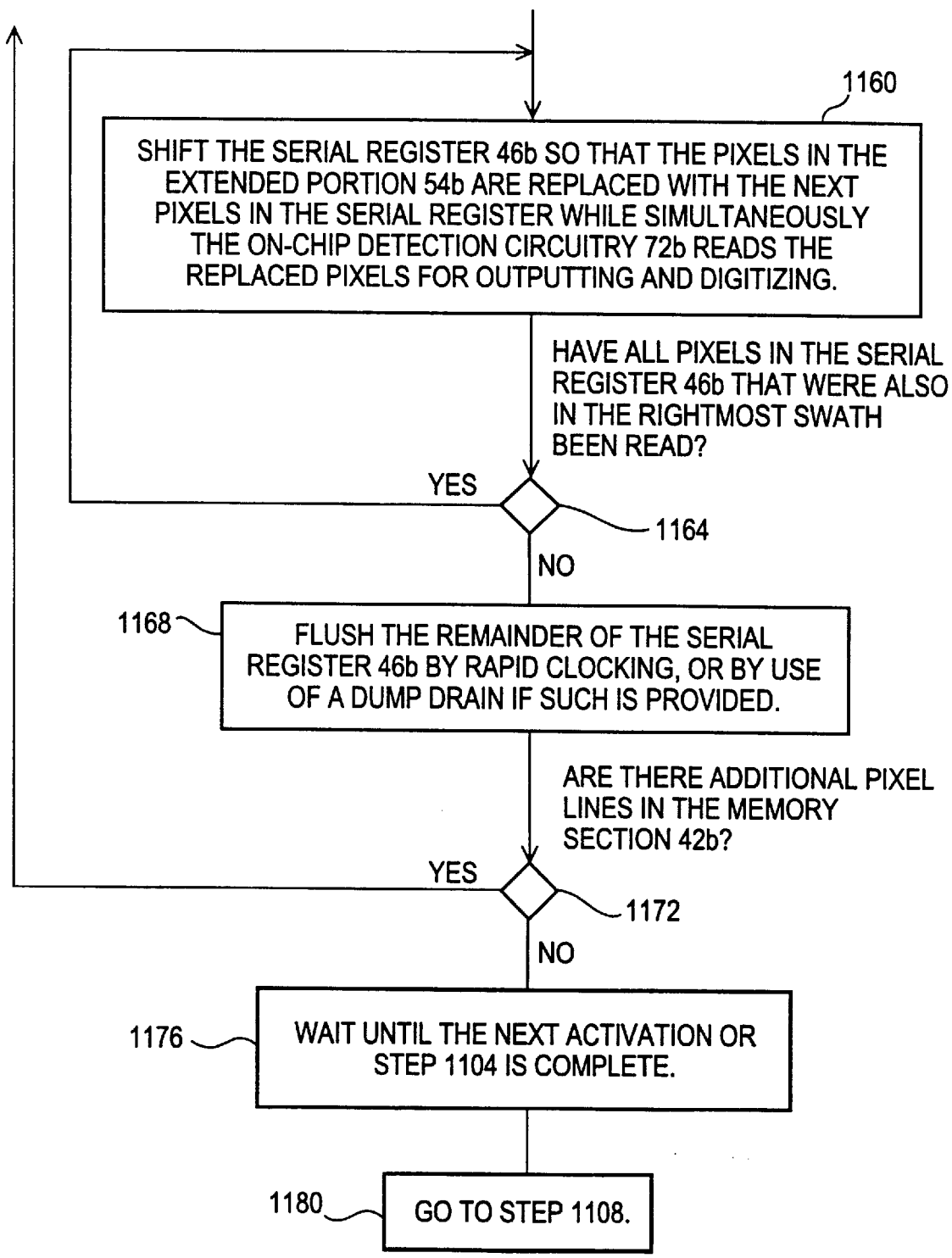

The flowchart of FIGS. 11A through 11C describes the steps performed during acquisition mode. In particular, this flowchart relates to a specific example, wherein it is assumed that: (a) the present invention includes a 512 by 512 split frame device with a 32 by 512 memory section 42 at opposition ends of the split frame device (as in FIG. 1), (b) the motion of the satellite or spacecraft is such that star images will enter on either the right or bottom edges of the imaging area 28, (c) the binning operation is for providing super-pixels that are 8 by 8 arrays of cells 36, (d) the swath along the bottom edge of the imaging area 28 is 24 cell rows high, and (e) the swath along the right edge of the imaging area 28 has a width of 24 columns of cells 36.

Additionally note that in the flowchart of FIGS. 11, the extended portions 54a and 54b (FIG. 1) are referenced, wherein such extended portions are extra cells 36 attached to an end of an associated serial register 46. Such extra cells of the extended portions are necessary for gaining physical room for needed electrical connections. Further note that the cells 36 of such extended portions do not pair up in a one-to-one fashion with cells 36 from rows 32 of the memory sections 42. Moreover, note that a typical size of such an extended portion 54 is eight cells 36. Accordingly, in the description of FIG. 11 hereinbelow, such extended portions 54a and 54b may be assumed to be eight cells 36 in length. However, it is within the scope of the present invention that other sizes for the extended portions may be used, as one skilled in the art will understand.

Referring now to the steps of FIGS. 11, in step 1104, an image is integrated on the imaging subareas 50a, 50b for a sufficient time period so as to accumulate signal charges thereon large enough to have an adequate signal-to-noise ratio. In step 1108, the first or bottom eight pixel lines of the imaging subarea 50b are shifted into the row $32b_2$ of the memory section 42b while holding the first phase electrode of the memory section 42b at a high potential so that this row becomes an accumulator for all eight of the pixel lines shifted out of the imaging subarea 50b. Subsequently, in step 1112, the memory section 42b is shifted one row 32 toward the serial register 46b. In step 1124, a determination is made as to whether there are further pixel lines in the imaging subarea 52b. If so, then steps 1108 through 1124 are iteratively performed until each consecutive set of eight pixel lines from the imaging subarea 50b are binned into a uniquely corresponding pixel line of the memory section 42b. Additionally, note that the steps 1108 through 1124 have corresponding steps that apply to imaging subarea 50a, and the memory section 42a such that the pixel lines of an integrated image in imaging subarea 50a is similarly compressed within the memory section 42a.

Steps 1128 through 1148 are for reading and digitizing the pixels within the swath along the bottom edge of the imaging area 28. Accordingly, the steps here have no counterparts to be performed using the imaging subarea 50a, the memory section 42a and the serial register 46a given the current illustrated location of the leading edges of the imaging area 28. In step 1128, the serial register 46b is cleared, and subsequently in step 1132, the pixel lines provided within the memory section 42b are shifted toward the serial register 46b so that the pixel line in row $32b_3$ moves into the serial register 46b. Subsequently, in step 1136, the pixels of the serial register 46b are shifted so that the corresponding extended portion 54b is filled with pixels from the serial register. In step 1140, the serial register 46b is again shifted so that the extended portion is filled with the next pixels in the serial register 46b, while concurrently the on-chip charge detection circuit 72b: (a) reads the pixels being replaced in the extended portion, and (b) outputs corresponding amplified signals to be digitized by a signal receiving A/D converter 90 (after the signal is processed by the corresponding preamplifier 76, and analog processor 80). Subsequently, in step 1144, a determination is made as to whether there are additional pixels in the serial register 46b. If so, then steps 1140 and 1144 are iteratively performed until all pixels within the serial register 46b have been read and digitized. Subsequently, step 1148 is performed wherein a determination is made as to whether there is another pixel line in the memory section 46b that represents part of the 24 pixel lines of the swath across the bottom of the imaging area 28. Accordingly, if there are further such pixel lines to be processed, then steps 1132 through 1148 are iteratively performed until all such pixel lines are processed.

Steps 1152 through 1172 of FIGS. 11 describe the processing performed on the pixels of the swath along the right edge of the imaging area 28. In particular, these steps describe the processing performed using the imaging subarea 50b, the memory section 42b, the serial register 46b and associated circuitry such as on-chip charge detection circuit 72b. However, note that since the right edge swath extends across the imaging subarea 50a as well, the steps 1152 through 1172 have corresponding steps that are applicable to the imaging subarea 50a, the memory section 42a, and the serial register 46a plus related circuitry. Accordingly, in step 1152, the pixel lines of the memory section 42b are shifted toward the serial register 46b so that the pixel line in row $32b_3$ moves into the serial register 46b. Subsequently, in step 1156, the pixels in the serial register 46b are shifted so that the extended portion 54b is filled, and the reset transistor of the on-chip detection circuit 72b is set so that subsequent pixels received are read and output to be digitized. Following this, steps 1160 and 1164 are iteratively performed for reading and subsequently digitizing the pixels of the right end of the serial register 46b that were derived from the right edge swath. Accordingly, once the right edge swath pixels have been processed, step 1168 is performed wherein the remainder of the pixels of the serial register 46b are flushed by rapid clocking, or by use of a dump drain if such is provided within an embodiment of the present invention. Subsequently, in step 1172, a determination is made as to whether there are additional pixel lines in the memory section 42b. If so, then steps 1152 through 1172 are iteratively performed for processing the pixels derived from the right edge swath while discarding or flushing pixels not derived from this swath. After all pixel lines within the memory section 42b have been processed, step 1176 is performed for waiting until another activation of step 1104 is complete, wherein another image has been integrated onto the imaging area 28. Subsequently, in step 1180, the flow of control is transferred to step 1108 for processing pixel lines of another instance of the bottom and right edge swathes.

Note that once the steps 1104 through 1180 of FIGS. 11 have been performed iteratively a sufficient number of times, the centroid and prediction modules 88 are able to determine whether the spectral characteristics and approximate location of any new star image within the swaths of the leading edges match corresponding information for known trackable stars in the star database 94.

Proceeding now to a more general description of the processing performed by the present invention, FIGS. 2 through FIG. 9 will now be described.

Figure 2A:
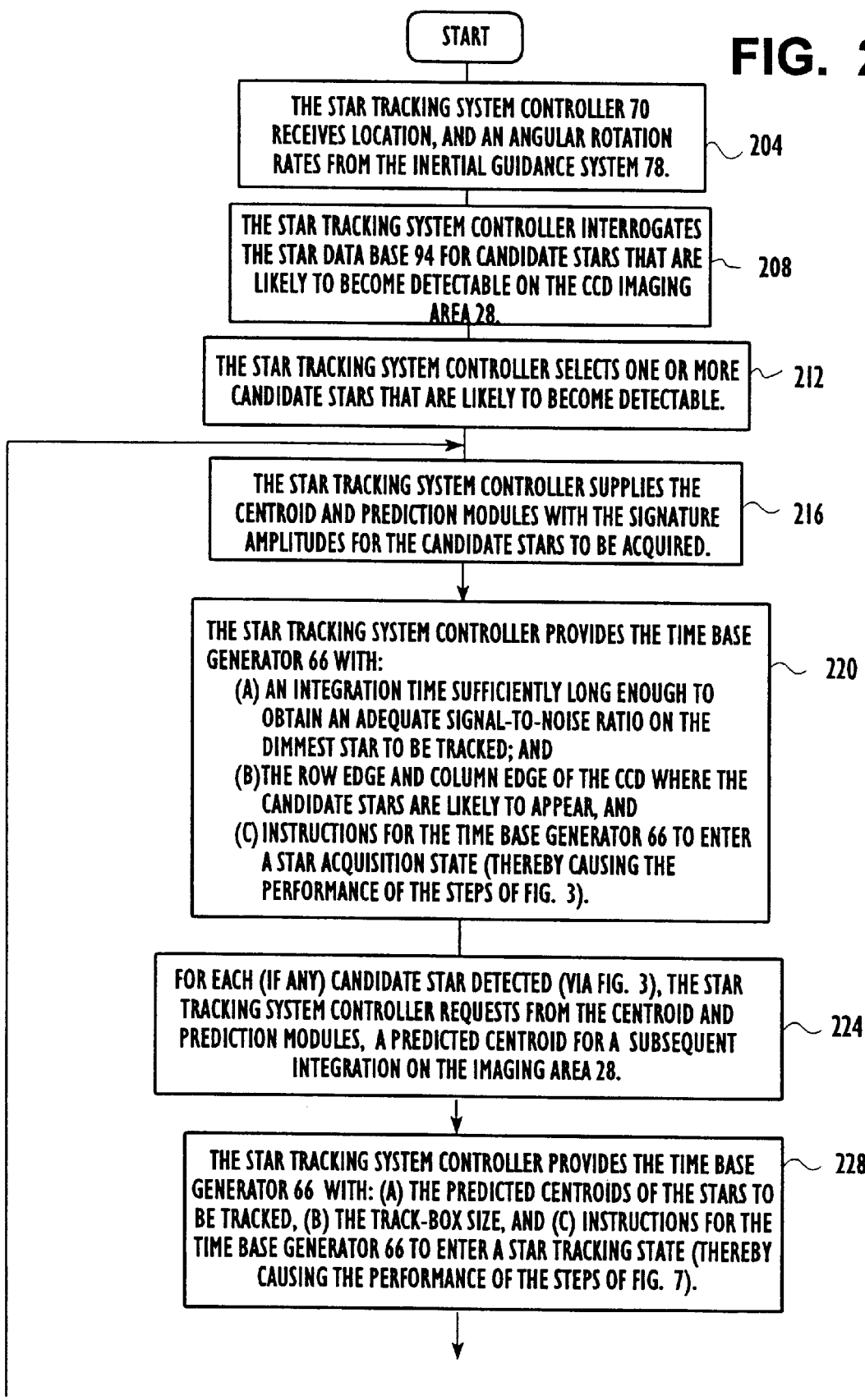
FIGS. 2A and 2B provide a high level flowchart of the steps performed by the star tracking system controller for tracking stars and acquiring new stars to be tracked.
Figure 2B:
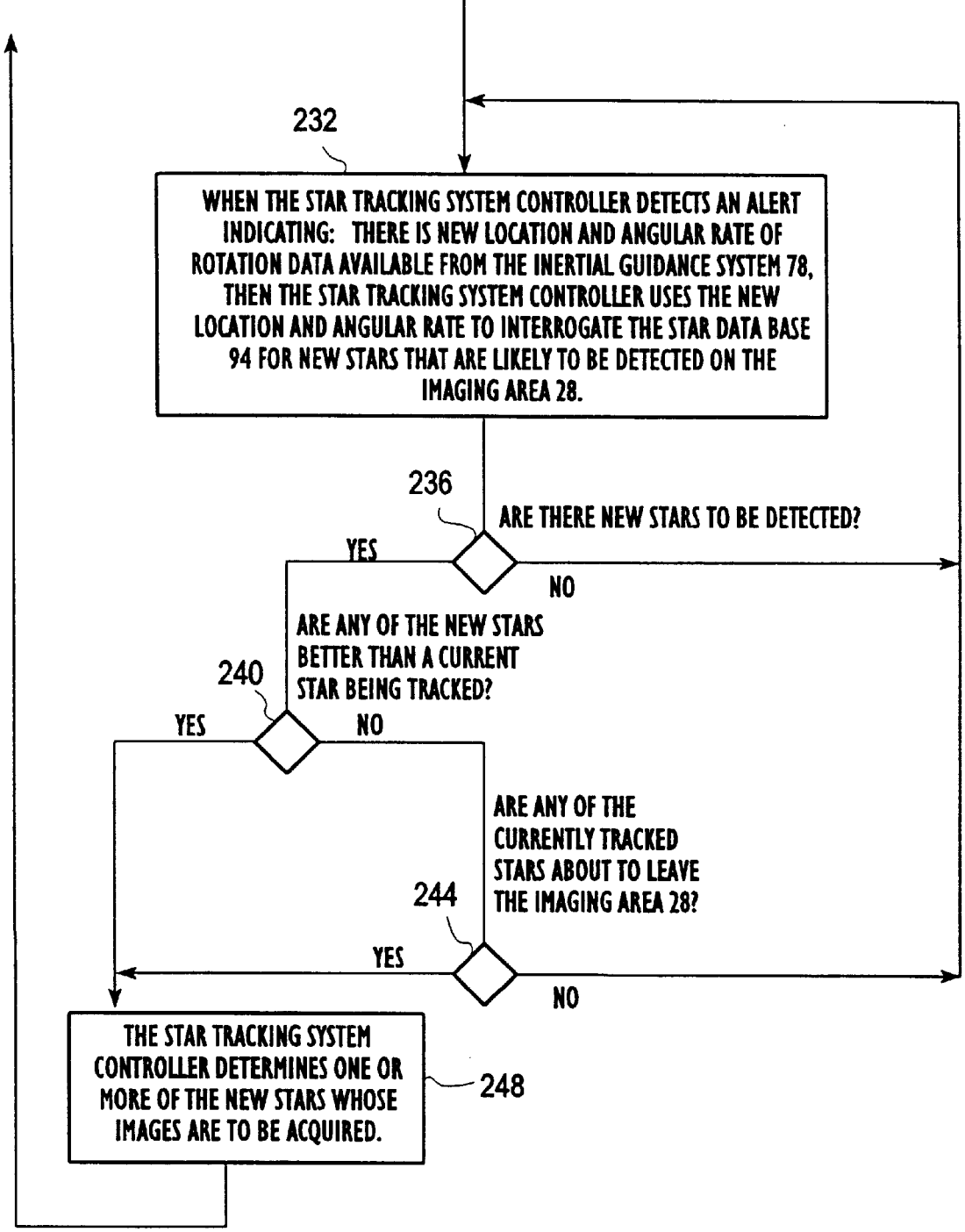

FIGS. 2A and 2B provide a description of the high level steps performed by the star tracking system controller 70 during operation of the star tracker 20. Accordingly, on initial activation of the star tracker 20, the star tracking system controller 70 receives location and angular rotation rates from the inertial guidance system 78 (step 204), and subsequently in step 208, the star tracking system controller interrogates the star database 94 for identifications of candidates stars that are likely to become detectable on the CCD imaging area 28. Assuming the star tracking system controller 70 receives such identifications of the candidate stars, the star tracking-system controller may select one or more such candidate stars (step 212) whose star images are desired to be tracked. The selection process used by the star tracking system controller 70 may include an analysis of the spectral characteristics (also denoted hereinbelow as a "signature") of the candidate stars, wherein such characteristics are contained in the star location data received from the star database 94. In particular, the star tracking system controller 70 may use an expected amplitude or intensity of each of various candidate stars for determining those stars that the star tracker 20 will endeavor to track. Subsequently, in step 216, the star tracking system controller 70 supplies the centroid and prediction modules 88 with signature data (e.g., including spectral amplitudes) indicative of each of the candidate stars to be acquired. Following this (step 220), the star tracking system controller 70 provides instructions to the time base generator 66 indicating (a) through (c):

(a) An integration time for capturing an image in the imaging area 28, wherein this integration time is sufficiently long enough to obtain an adequate signal-to-noise ratio for the dimmest star to be tracked;

(b) The edges of the imaging area 28 where the candidate star image(s) is likely to appear. Note that such edges are no more than a single one of the row edges 30 and 34, plus, no more than one of the column edges 38 and 40 as described previously; and (c) That the time base generator 66 is to enter a star acquisition mode for performing the steps of the flow-chart of FIG. 3 described hereinbelow.

Subsequently, in step 224, for the each of the candidate stars whose star image is detected, the tracking system controller 70 requests from the centroid and prediction modules 88 a predicted centroid of the star image for a subsequent integration on the imaging area 28. Given this prediction information, the star tracking system controller 70, in step 228, provides the time base generator 66 with (a) through (c) following:

(a) The predicted centroids of the stars to be tracked in the next integration;

(b) For each predicted centroid, the dimension(s) of a track-box 200 of the imaging area 28 in which the corresponding star image is highly likely to be entirely included; and (c) Instructions to enter a star tracking state or mode, wherein the steps of FIG. 7 described hereinbelow are performed.

Note that in one embodiment, each such track-box is a square array of 12×12 CCD cells 36. Further note that the size of such track-boxes (in terms of CCD cells) is dependent upon the following characteristics of the star tracker 20:

(i) The angular subtense of each CCD cell 36, (ii) The expected amount of spectral energy spread across the imaging area 28 by each of the star images during an integration, and (iii) Values indicative of the possible error in centroid predictions for subsequent image integrations.

Also note that regarding (ii) immediately above, the star images provided on the imaging area 28 may be purposely defocused in order to provide a larger image on the imaging area 28 of each star being tracked. Such defocusing of star images has been found to yield, in some cases, more accurately computed star image centroids, and in particular, star images computed to an accuracy smaller than the CCD cells 36.

Subsequently, in step 232, the star tracking system controller 70 is periodically alerted by the inertial guidance system 78 that there is a new satellite location and/or new angular rotation rates for the satellite. Accordingly, the star tracking system controller 70 uses this new information to interrogate the star database 94 for new stars that are likely to be detected on the imaging area 28. In step 236, the star tracking system controller 70 subsequently determines whether there are new star identifications to be retrieved from the star database 94 that are likely to be detected. If there are no such new star identifications retrieved, then the flow of control returns to step 232 to await additional satellite location and/or angular rates of rotation data from the inertial guidance system 76. However, it should be noted that the star tracking system controller 70 may be involved concurrently in performing other processes related to star tracking when not actively performing step 232. In particular, the star tracking system controller 70 may be actively involved in controlling the tracking of currently detected stars according to the processing performed in FIG. 7 described hereinbelow.

If in decision step 236, the star tracking system controller 70 determines. that there are new stars that may be detected, then step 240 is performed wherein a determination is made as to. whether any of the new stars are better candidates to be tracked than one or more of the stars being currently tracked. If not, then step 244 is performed wherein an additional determination is made as to whether any of the currently tracked stars are about to leave the imaging area 28. Thus, if none of the currently tracked stars are about to leave the imaging area 28, then again, the flow of control returns to step 232. However, if one or more currently tracked stars are about to leave the imaging area 28, then step 248 is performed wherein the star tracking system controller 70 determines whether one or more of the new stars have images that are appropriate to be acquired (e.g., the images have a sufficiently high expected spectral amplitude). Note that step 248 is also performed when step 240 results in an indication that one or more of the new stars that may be detected are determined to be better candidates for tracking than one or more of the currently tracked stars.

Finally, note that once step 248 is performed, the star tracking system controller 70 returns to step 216 in preparation for directing the time base generator 66 to enter at a star image acquisition mode.

In FIG. 3, a flowchart is presented illustrating the high level steps performed during star acquisition once the star tracking system controller 70 has instructed the time base generator 66 to enter a star acquisition mode or state. Accordingly, in step 304 of FIG. 3, the time base generator 66 obtains from the star tracking system controller 70 the adjacent edges of the imaging area 28 where one or more new stars to be tracked are predicted to appear. Note that one of these edges will be a row edge 30 or 34, and the other edge will be one of the column edges 38 or 40. In particular, the two edges provided are the edges where new fields of view are entering the imaging area 28. Subsequently, in step 308 and step 312, the row edge and the column edge identified in step 304 are assigned to the variables RE and CE, respectively, for notational convenience. Additionally, in steps 316 and 320, the two serial registers 46a and 46b are distinguished from one another for notational convenience. In particular, the serial register adjacent row edge RE is denoted by the identifier $SR_{RE}$, and the serial register 46 at the opposite end of the CCD 24 is denoted by the parameter $SR_{OPP}$. In step 324, the time base generator 66 causes the imaging subareas 50a and 50b to be exposed to ambient spectral radiation for a sufficient length of time to accumulate pixel charge in these imaging subareas large enough to have an adequate signal-to-noise ratio for identifying the new one or more stars. Note that the time for such spectral radiation exposure (also known as integration time) is provided by the star tracking system controller 70, and this length of time may be, in some embodiments, a constant while in other embodiments it may be variable that depending on the expected amplitudes of the spectral radiation emitted from the one or more stars whose images are expected to be acquired during star acquisition.

Figure 4:
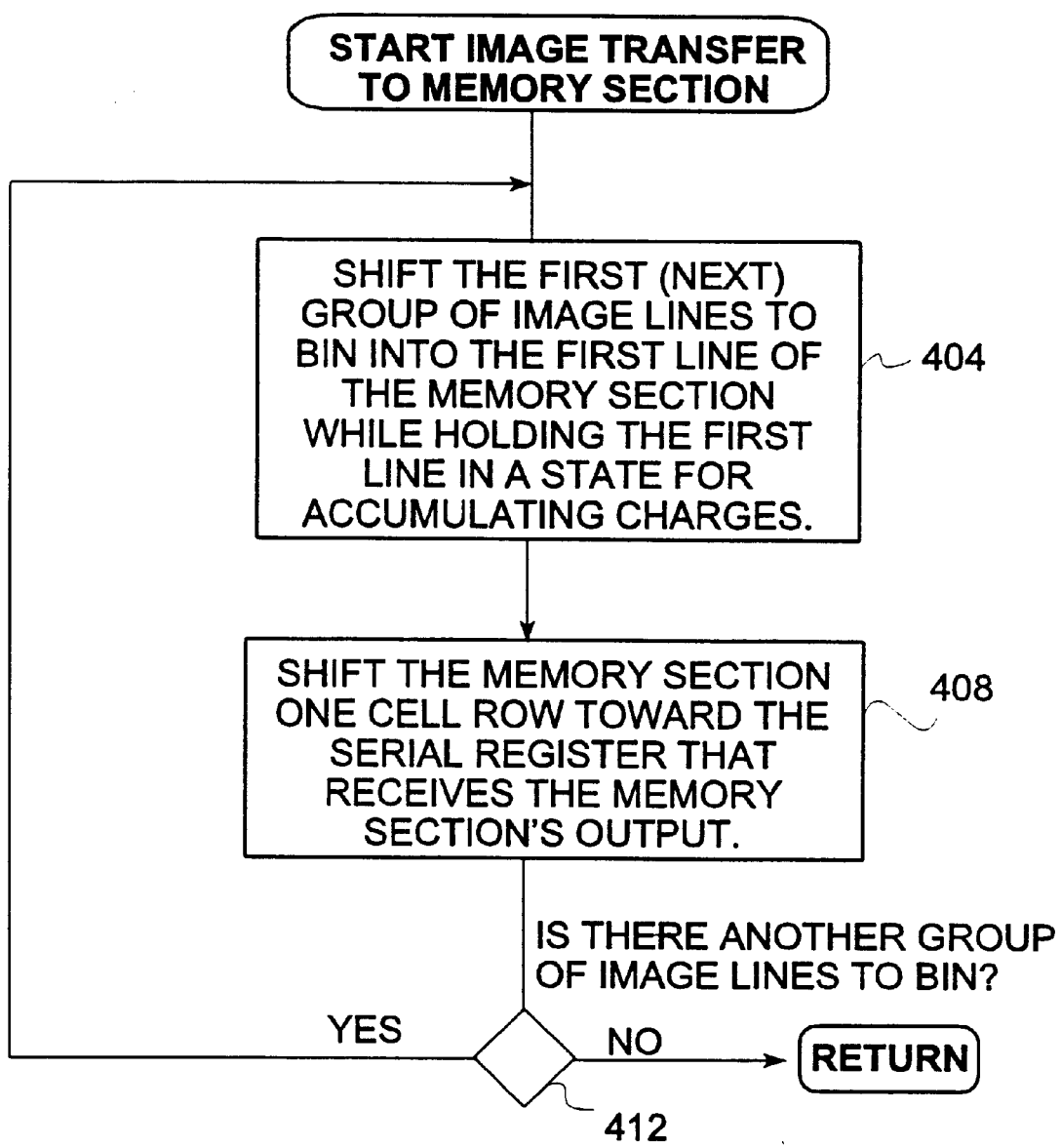
FIG. 4 is a flowchart of the steps performed during the transferring of an image from the imaging area to the memory section of the CCD.

During and/or following step 324, step 328 is performed wherein the serial registers 46a and 46b are cleared. Subsequently, following both steps 324 and 328, steps 332 through 352 are performed wherein the integrated images in the imaging subareas 50a and 50b are first transferred to their respective memory sections 42a and 42b where each of their corresponding images are compacted within their respective reduced size memory sections. In particular, in steps 332 and 336, the process illustrated by the flowchart of FIG. 4 is performed for compacting each of the images in the imaging subareas 50a and 50b into its corresponding memory section 42a and 42b respectively. The process for this compaction will be briefly discussed now. The flowchart of FIG. 4 bins together pixel lines into the first cell row (i.e., $32a_1$ or $32b_1$) of the corresponding memory section. More precisely, the time base generator 66 provides control signals (via lines 62) to each of the imaging subareas 50a and 50b so that each of these subareas shift their pixel lines toward their respective memory sections 42, and the pixels in the cell rows $32a_1$, $32b_1$ are transferred into the adjacent cell rows $32a_2$ and $32b_2$ respectively. Further, multiple contiguous pixel lines from the imaging subareas are binned within memory section cell rows $32a_2$ and $32b_2$ so that the images in the imaging subareas 50a and 50b are compacted into their corresponding memory sections 42a and 42b. That is, the pixel lines are binned in groups (e.g., eight pixel lines per group) as indicated in step 404 of FIG. 4. Subsequently, in step 408, once a group of consecutive pixel lines are binned, the time base generator 66 instructs the corresponding memory section to shift the pixel lines of binned pixels one cell row 32 toward the serial register 46 that receives output from the memory section. Following this, in step 412, a determination is made by the time base generator 66 as to whether there are additional consequentive pixel lines to bin. If so, then steps 404 through 412 are repeated, if not then the program of FIG. 4 terminates and returns to the corresponding step (either 332 or 336 of FIG. 3) from which the program corresponding to FIG. 4 was activated.

Referring again to FIG. 3, once step 332 is performed, step 340 is encountered wherein the output of the binned row edge pixel line swath in the memory section $MS_{RE}$ is output to the corresponding serial register $SR_{RE}$ by a process corresponding to the flowchart of FIG. 5 described hereinbelow. Subsequently, step 344 is performed wherein the binned column edge swath of pixels in the memory section $MS_{RE}$ is output by the steps of FIG. 6, as will also be described hereinbelow. Additionally, note that since the column edge swath extends over both imaging subareas 50a and 50b, step 344 is also performed on memory section $MS_{OPP}$ following step 336. Accordingly, steps 344 through 352 are duplicately performed on each of the flow of control paths beginning, respectively, with the steps 332 and 336.

Following the performance of step 344, the output from the binned row edge swath of pixels and the output from the binned column edge swath of pixels have been supplied (via on-chip charge detection circuits 72 and components 76, 80 and 90) to the centroid and prediction modules 88 for identifying any of the candidate star images that may have entered the field of view of the imaging area 28. Accordingly, in step 349 the centroid and prediction modules 88 determine whether there is a cluster of pixel charges within one of the binned row swath or binned column swath that matches the anticipated signal amplitude at the anticipated location for any of the candidate stars for tracking. Accordingly, in step 352 the centroid and prediction modules 88 output to the tracking system controller 70 the identifiers for any stars whose signal amplitudes were identified. Subsequently, the process corresponding to FIG. 3 terminates and returns to step 220 of FIG. 2A.

As mentioned hereinabove, FIG. 5 provides a high level description of the steps performed by each memory section 42a and 42b in coordination with its corresponding serial register 46a and 46b, respectively, for outputting a binned row edge swath of pixels. Accordingly, in step 504 of FIG. 5, the serial register, (denoted herein as SR) for the memory section having the row edge swath of pixels, is cleared. Subsequently, in step 508, the pixel line within the adjacent memory section cell row (one of $32a_3$ and $32b_3$) is transferred into the serial register SR. Following this, in step 512, the serial register SR is instructed by the time base generator 66 to parallelly shift its cell charges (e.g. pixel charges) toward the extended positions 54 of the serial register SR, and clear the detection node of the on-chip charge detection circuit 72 receiving output from SR. Subsequently in step 516, signals corresponding to the pixel charges within the extended register portion 54 are transferred (via components 72, 76, and 80) to the A/D converter 90 so that these signals may be digitized according to signal amplitude as indicated in step 520. Subsequently, in step 524, the A/D converter 90 outputs the corresponding digitized data to the centroid and prediction modules 88 and in step 528, the on-chip charge detection circuit 72 waits for a next group of pixels to be read from the extended portion 54 of the serial register SR, wherein once such further signals corresponding to the binned pixel values are available, step 520 is again performed.

In addition to, and at least somewhat independent of, the processing performed in steps 520 through 528, step 532 is performed by the time base generator 66 for determining whether there is additional pixel data in the serial register SR. Accordingly, if there is, then step 512 (and subsequent steps) are performed as discussed above. Alternatively, if all such pixel data in serial register SR has been read (via the on-chip charge detection circuit 72), then step 536 is performed for determining whether there is another pixel line in the memory section having row edge swath binned data therein. If so, then steps 504 (and subsequent steps) are again performed. Alternatively, the process corresponding to the flowchart of FIG. 5 terminates and the flow of control returns to step 340 of FIG. 3.

Figure 6A:
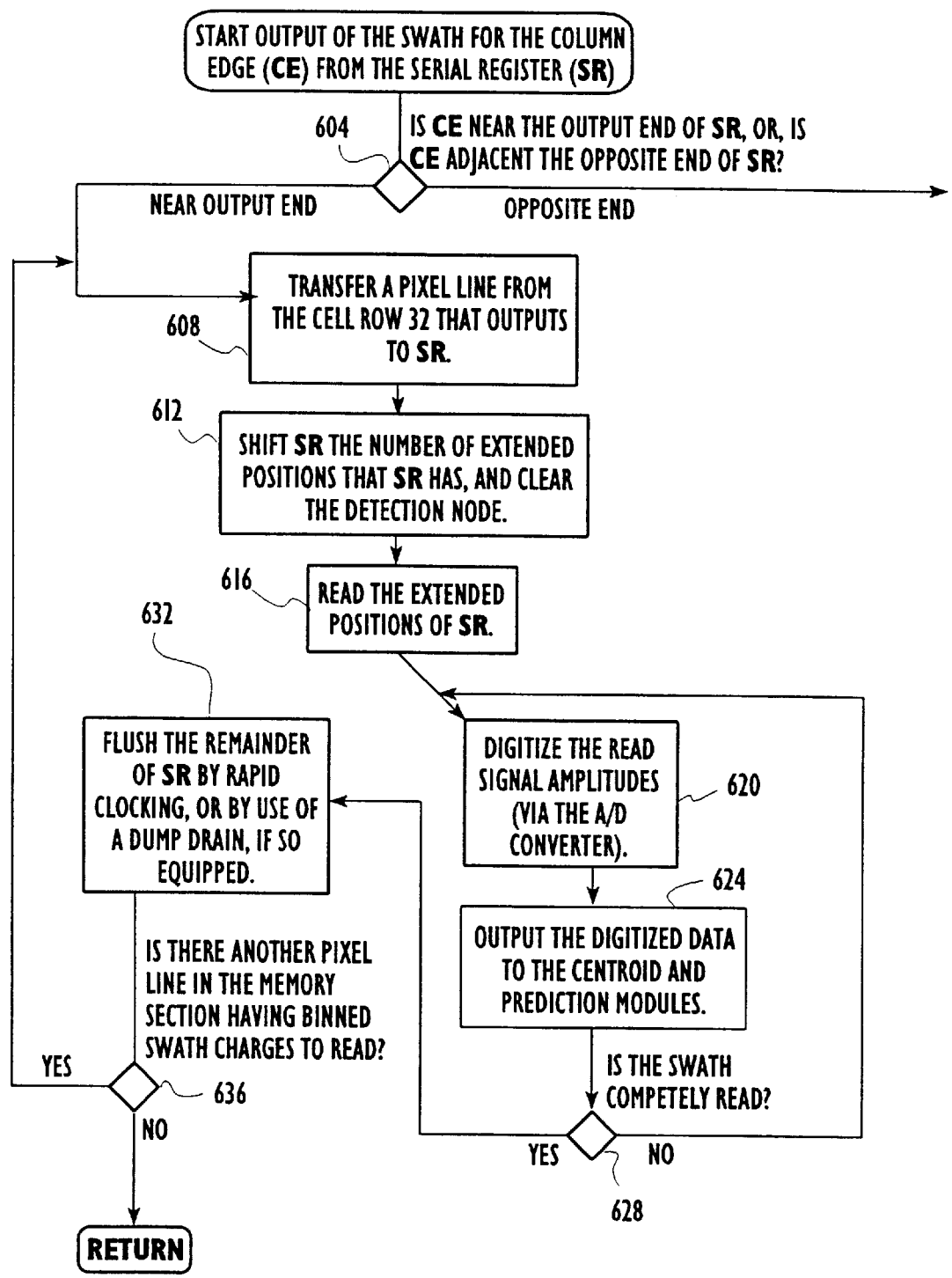
FIGS. 6A and 6B illustrate the steps of a high level flowchart for outputting, from one of the portions of the split memory section to its corresponding serial register, pixels obtained from a swath of columns of imaging area cells along an edge of the imaging area during the star acquisition.
Figure 6B:
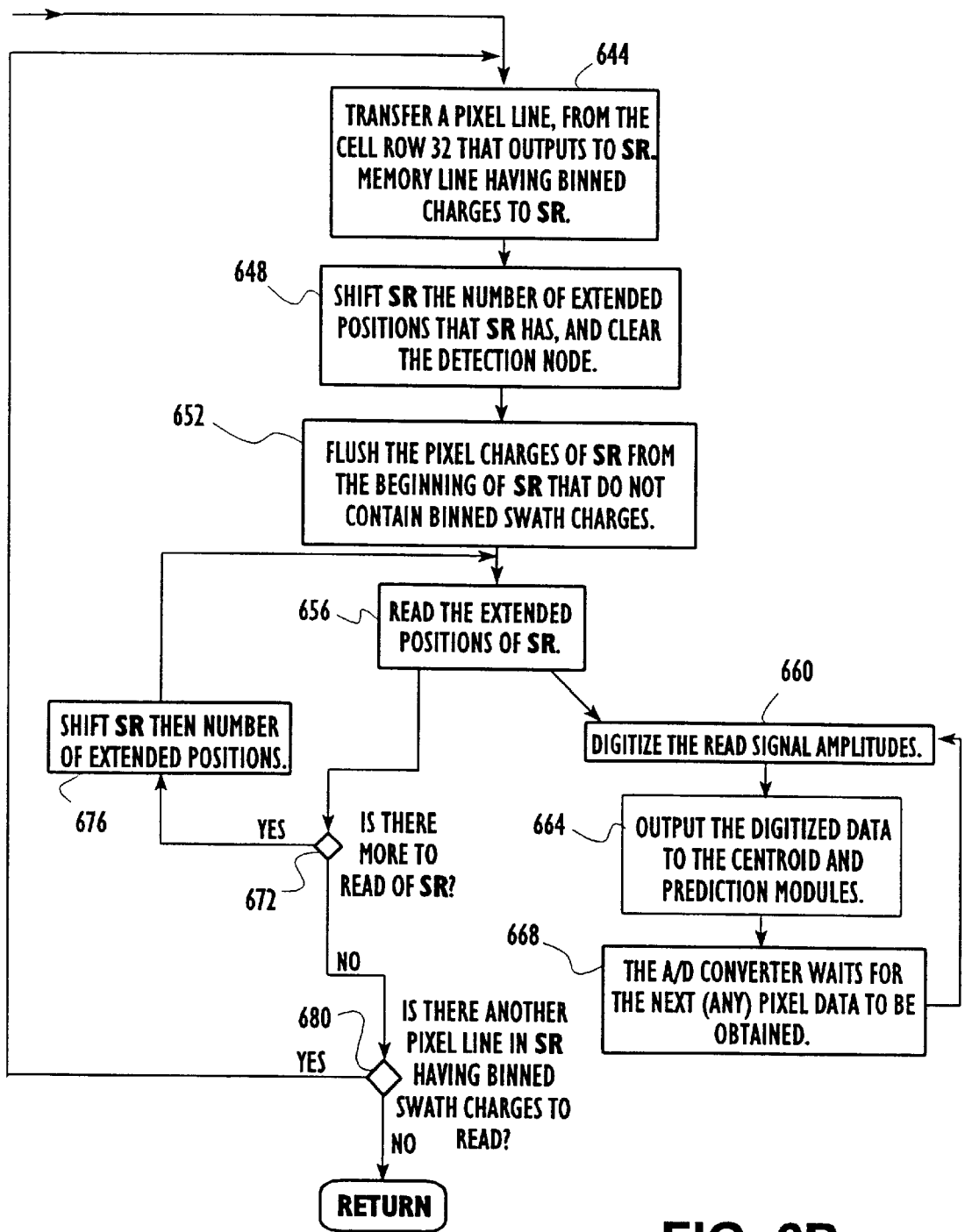

FIGS. 6A and 6B provide a flowchart corresponding to the high level steps performed by the present invention for outputting the portion of the binned column edge swath of pixels contained in one of the memory sections 42a and 42b. In particular, the flowchart of FIGS. 6A and 6B is performed for each of the memory sections 42a and 42b when the column swath pixel data therein is output to the respective corresponding serial register 46a and 46b. Accordingly, in step 604, a determination is made as to whether the column edge (CE) for this column swath of pixels is near the output end of the memory section serial register (SR), or, whether CE is adjacent the opposite end of this serial register. Assuming the time base generator 66 determines that the column edge is near the output end of the serial register SR, then step 608 is performed wherein the time base generator 66 causes the memory section to transfer the pixel charges in the adjacent row cell (i.e., either 36$a_3$ or 36$b_3$) into the serial register SR. Subsequently, in step 612, the time base generator 66 instructs the serial register SR to shift its pixel charges the number of extended positions in the extended portion 54 of SR and clear the detection node of the on-chip charge detection circuit 72 receiving output from SR. In step 616, signals corresponding to the pixel charges within the extended portion 54 of SR are output to the on-chip charge detection circuit 72, which under control of the star tracking system controller 70, outputs such corresponding signals to either the drain 86, or one of the preamplifiers 76. In particular, since the swath is on the edge whose pixels are first read into the extended portion 541 in step 620 the first collection of pixels read into this extended portion have their corresponding signals eventually digitized by an A/D converter 90 and the resulting digitized output is provided to the centroid and prediction modules 88 in step 624. Subsequently, in step 628, a determination is made by the time base generator 66 as to whether the pixels of the column edge swath have been completely output. If not, then step 620 is again encountered for subsequently digitizing and outputting the signals (corresponding to the swath edge pixels) to the centroid and prediction modules 88. Alternatively, if the time base generator 66 determines that all pixels of the swath have been read, then in step 632 the remainder of the pixel charges in the serial register SR are purged or flushed from SR. Subsequently, in step 636, the time base generator 66 determines if there is another pixel line in the memory section having binned swath charges. If so, then the flow of control is transferred back to step 608 for processing the next such pixel line. Alternatively, if the result of step 636 is negative then all pixel lines in the memory section have been processed. Accordingly, the process corresponding to the flowchart of FIG. 6 terminates and a return is made to the process corresponding to the flowchart of FIG. 3 at step 344.

Referring again to Step 604, if the swath for the column edge CE provides pixel charges at the opposite end of the serial register SR from the end having the extension portion 54, then step 644 is next encountered wherein a pixel line from the cell row 32 that outputs to the serial register SR is transferred into SR. Subsequently, in step 648, the time base generator 66 shifts the serial register SR the number of extended positions in portion 54 and clears the detection node of the on-chip charge detection circuit 72 receiving output from SR. In step 652, the time base generator 66 causes the pixel charges of the serial register SR at the beginning of the serial register to be purged or flushed. Subsequently, all remaining pixel charges in the serial register SR are those from the swath. Accordingly, in step 656, the extended positions of serial register portion 54 are read and their corresponding signals are transferred (eventually) to A/D converter 90 so that their signal amplitudes can be digitized as indicated in step 660. Subsequently, in step 664, the A/D converter 90 outputs corresponding digitized data to the centroid and prediction modules 88 for storing until an image of the entire swath is obtained which then allows a determination to be made as to whether any of the expected star images have been detected. Additionally, in step 668, the A/D converter 90 waits for further pixel data to be obtained from the on-chip charge detection circuit 72, and when such data is obtained step 660 is again activated for digitizing this data. In parallel and coordinated with performing the steps 660 through 668, the time base generator 66 determines in step 672 whether there is more pixel data to be read from the serial register SR. If so, then in step 676 the time base generator 66 causes the serial register SR to shift its pixel charges toward the extended portion 54 the number of cells within this extended portion. Then step 656 can again be performed for thereby outputting the corresponding signals for the pixel charges within extended portion 54.

Referring again to steps 672, if it is determined that there are no further pixels in the serial register SR, then step 680 is performed, wherein the time base generator 66 determines if there is another pixel line in the memory section having binned swath charges. If so, then step 644 is again encountered to process this new pixel line. Alternatively, the processing of pixel lines in the image section is complete, and the process corresponding to FIGS. 6A and 6B terminates with a return to the step 344 of FIG. 3 occurs.

FIG. 7 is a flowchart of the high level steps for tracking stars once acquisition of their star images has been obtained. Accordingly, in step 704, star tracking commences with the integration of spectral radiation on the imaging area 28 for a sufficient period of time to accumulate cell charges large enough to have an adequate signal-to-noise ratio on the dimmest star being currently tracked. After the integration time period has expired, in step 708, each imaging subarea 50a and 50b transfers the pixel lines of its accumulated image to the respective corresponding memory section 42a and 42b, wherein the image is compacted by binning together its pixel lines that do not intersect any track-box 200 (FIG. 1). Note that detailed steps for performing this process are provided in FIG. 8 discussed hereinbelow. Once the images of the imaging subareas 50a and 50b have been transferred to their respective corresponding memory sections 42a and 42b, the time base generator 66 subsequently configures the imaging area 28 to again perform step 704, for integrating spectral radiation received on the imaging area 28. Note that in one embodiment of the present invention, approximately 100 integrations per second are performed. Additionally, in step 712 following step 708, the time base generator 66 directs each memory section 42a and 42b to transfer each pixel charge of a track-box to the corresponding serial register 46 to which the memory section outputs, and consequently such pixel charges are digitized and provided to the centroid and prediction modules 88. Note that the details of step 712 are provided in FIG. 9 discussed hereinbelow. In step 716, the time base generator 66 delays any further memory section processing until there are additional pixels available for transfer from the imaging area 28. In parallel with step 716, step 720 may be performed wherein the centroid and prediction modules determine whether any track-box digitized pixel data has been obtained. Accordingly, if such data has not been obtained, then step 724 is performed wherein the centroid and prediction modules 88 wait for track-box data to be supplied via one of the A/D converters 90. Alternatively, if track-box pixel data is supplied to the centroid and prediction modules 88, then in step 728, the centroid and prediction modules 88 determine the charge amplitude centroid for a first of the track-boxes whose data has been input thereto. Subsequently, in step 732, the centroid and prediction modules 88 predict a new centroid location on the imaging area 28 for the star image whose centroid was calculated in step 728. Note that this predicted new centroid location is determined using the angular rate of rotation of the satellite as supplied by the inertial guidance system 78. In step 736, the centroid and prediction modules 88 determine whether the newly predicted centroid is located on the imaging area 28. If it is determined that the predicted centroid is not on the imaging area 28, then step 740, the star tracking system controller 70 is alerted that the corresponding star can no longer be tracked. Alternatively, if the results at step 736 indicate that the predicted new centroid is in the imaging area 28, then step 744 is performed for outputting the predicted centroid to the star tracking controller 70. Subsequently, in step 748, a determination is made by the star tracking controller 70 as to whether continued tracking of the star identified by the newly predicted centroid should occur. If so, then in step 752, the star tracking controller 70 instructs the time base generator 66 that the pixel values within a track-box 200 centered about the newly predicted centroid are to be output from the imaging area 28 without being compacted or binned within one of the memory sections 42a and 42b. Subsequently, regardless of the path taken from step 736 for determining how to use the newly used predicted centroid, in step 756, a determination is made by the centroid and prediction modules 88 as to whether there is additional track-box pixel data from which a new centroid can be determined. Accordingly, if such additional data is available, then step 728 is again performed for calculating a current and a predicted centroid for the new track-box data. Alternatively, if no such further track-box data is available, then step 724 is performed wherein the centroid and prediction modules 88 wait for such data.

Figure 8:
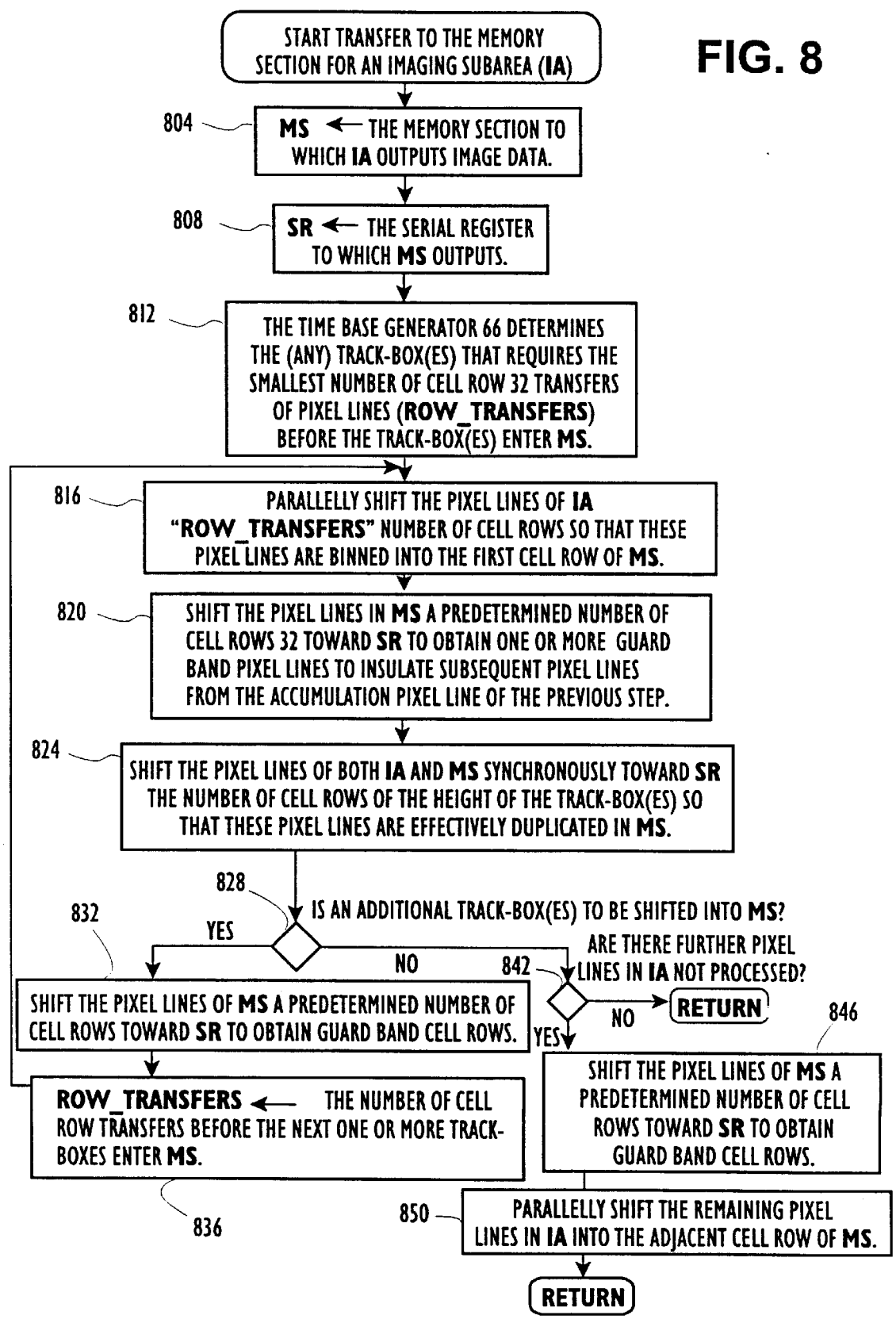
FIG. 8 is a flowchart for transferring an image from the imaging area to the memory section according when tracking star images.

In FIG. 8, a flowchart of the high level steps performed by one of the imaging subareas (50a or 50b), and the corresponding memory section (42a or 42b) when these components are controlled by the time base generator 66 for transferring an image from the imaging subarea (denoted, "IA") to its corresponding memory section. Accordingly, in step 804, the memory section (42a or 42b) corresponding to the imaging subarea is denoted by the identifier MS. Additionally, in step 808, the serial register 46 to which the memory section MS outputs its pixel lines is identified by the identifier SR. Assuming that the imaging subarea denoted by IA has an image integrated thereon, in step 812, the time base generator 66 determines whether there are any track-boxes 200 provided within the imaging subarea IA, and if so, then the time base generator determines which of the one or more track-boxes is closest to the memory section MS. In particular, the time base generator 66 determines the number of cell rows 32 between the (any) track-box 200 closest to MS, and the memory section MS, this value being assigned for notational convenience to the variable "ROW_TRANSFERS." Subsequently, in step 816, the time base generator 66 provides control signals to the imaging subarea IA (via lines 62) for parallelly shifting the pixel lines of IA ROW-TRANSFERS number of cell rows 32 (assuming at least track-box exists in IA). Moreover, note that the time base generator 66 maintains an electrical configuration of the memory section MS during this shifting of the AI pixel lines so that the pixel lines shifted into the memory section are binned together into the first cell row 32 that receives the pixel lines (i.e., one of the cell rows $32a_2$ and $32b_2$). In step 820, the time base generator 66 causes the memory section MS to shift the pixel lines therein a predetermined number of cell rows 32 toward the serial register SR to thereby obtain one or more guard band pixel lines that are used for insulating subsequent pixel lines to be read into the memory section MS from the binned pixel line resulting from step 816. As a result of seeps 816 and 820, the configuration of the imaging subarea IA is such that there is a track-box 200 intersecting the imaging subarea cell row adjacent the memory section MS (i.e., either cell row $32a_2$ or $32b_2$), and additionally, the binned pixel line has been shifted further into MS so that guard band lines provide a place to accumulate dark current and background signal charge between the binned pixel line and subsequent pixel lines transferred into the memory section MS. Accordingly, in step 824, the time base generator 66 synchronously shifts the pixel lines of both the imaging subarea IA and the memory section MS toward the corresponding serial register SR, wherein the pixel lines are shifted the number of cell rows 32 necessary to completely shift into MS the track-box(es) 200 that previously intersected the cell row 32 immediately adjacent the memory section MS. Accordingly, the trackbox(es) 200 are effectively duplicated within the memory section MS. It is worth noting in this context that the track-box(es) 200 may be aligned as in FIG. 1. That is, the edges of the track-boxes 200 align with CCD cell 36 rows and columns of the imaging area 28. However, it is within the scope of the present invention that track-boxes 200 may have geometries other than squares; in particular, circles, triangles and other polygonal regions may also be utilized by the present invention. Additionally, it is within the scope of the present invention to also use amorphously defined regions as track-boxes. Further, it is worthwhile to note that since the stars to be tracked can be selectively chosen, and since during tracking, track-boxes 200 retain their relative distances to one another, stars can be chosen for tracking wherein their corresponding track-boxes 200 are sufficiently spaced apart on the imaging area 28 so that any two such track-boxes 200 either have identical cell rows 32, or more typically, they have no cell row 32 in common.

In step 828, the time base generator 66 determines if there is an additional track-box 200 to be shifted into the memory section MS. Accordingly, if there is, then step 832 is performed wherein the pixel lines of the memory section MS are shifted a predetermined number of cell rows 32 toward the serial register SR to obtain additional insulating guard band lines substantially as in step 820. Subsequently, in step 836, the time base generator 66 determines the number of cell rows 32 between the memory section MS and the closest track-box 200 thereto in the imaging subarea IA. Subsequently, step 816 and steps following are again performed for binning those cell rows 32 not intersecting a track-box 200, and then (step 824) duplicating in MS those pixel lines that intersect a next track-box 200. It is noteworthy that the number of iterations through the loop of steps 816 through 832 is bounded by the number of cell rows 32 in the memory section MS. Moreover, the maximal number of iterations of this loop is equal to the maximal number of track-boxes 200 (having non-intersecting cell rows) in IA. The number of cell rows 32 in the MS is also a function of the number of guard band lines. A guard band line needs to lead the first track box and trail the last track box. These guard band lines provide a place to accumulate dark current and background signal charge. Guard band lines should also be apportioned based on the number of lines between track boxes and how far a track box is located from the top and bottom edges as appropriate.

Referring again to decision step 828, if there are no additional track-boxes 200 to be shifted into the memory section MS, then decision step 842 is performed wherein it is determined whether there are further pixel lines in the imaging subarea IA not already binned together. Accordingly, if such pixel lines remain in the imaging subarea IA, then step 846 is performed, wherein additional guard band lines are provided within the memory section MS, and subsequently in step 850, the remaining pixel lines in the imaging subarea IA are binned together in the adjacent cell row of the memory section MS (i.e., either cell row $32a_2$ or $32b_2$). Subsequently, the process corresponding to FIG. 8 terminates and the flow of control returns to step 708 of FIG. 7. Alternatively, if in step 842, there are no further pixel lines in IA to be processed, then the process corresponding to FIG. 8 also terminates and the flow of control returns to step 708 of FIG. 7.

Figure 9:
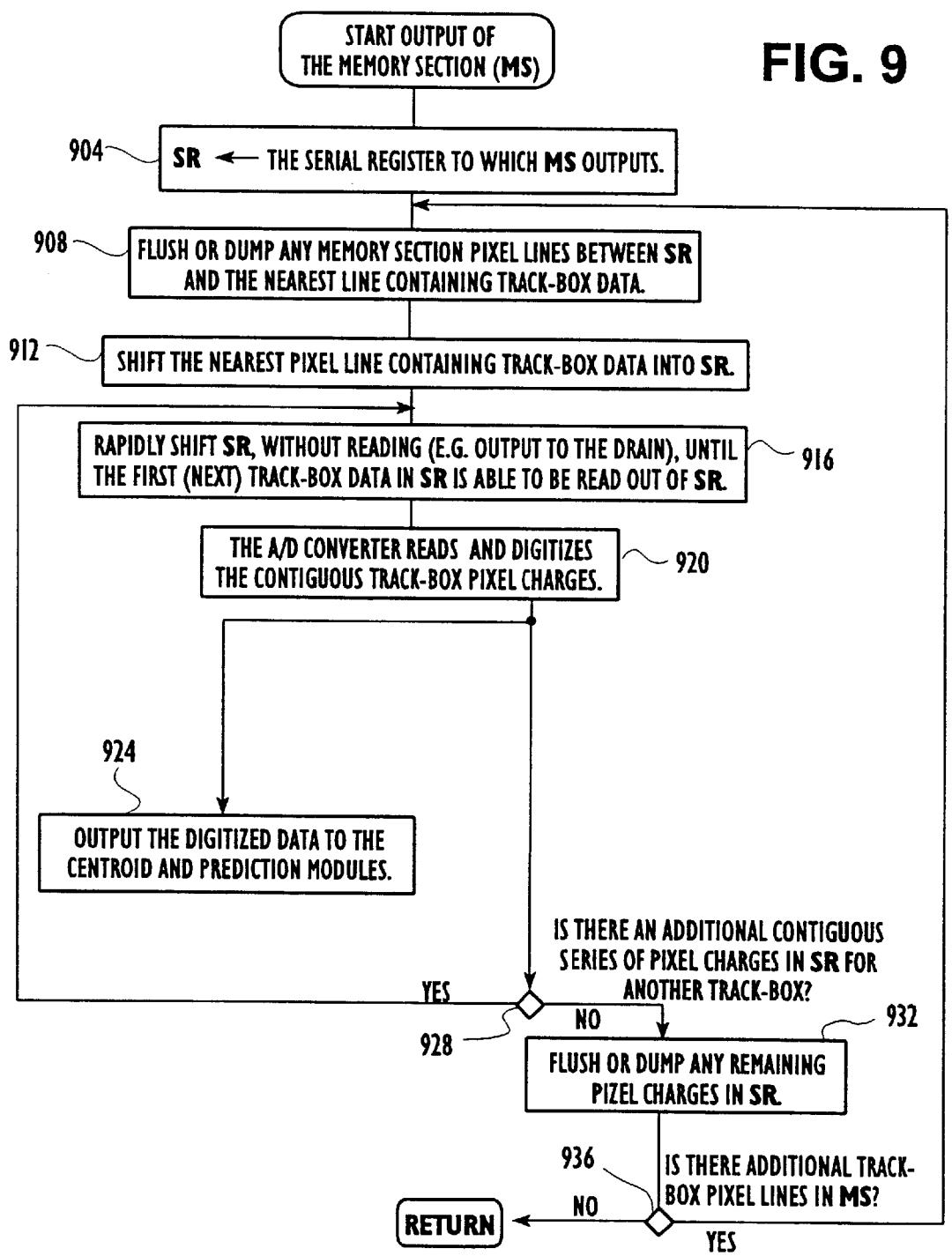
FIG. 9 is a flowchart for outputting a compacted image in the memory section to other components of the present invention such as a corresponding serial register, an A/D converter, and centroid and prediction modules.
Figure 10A:
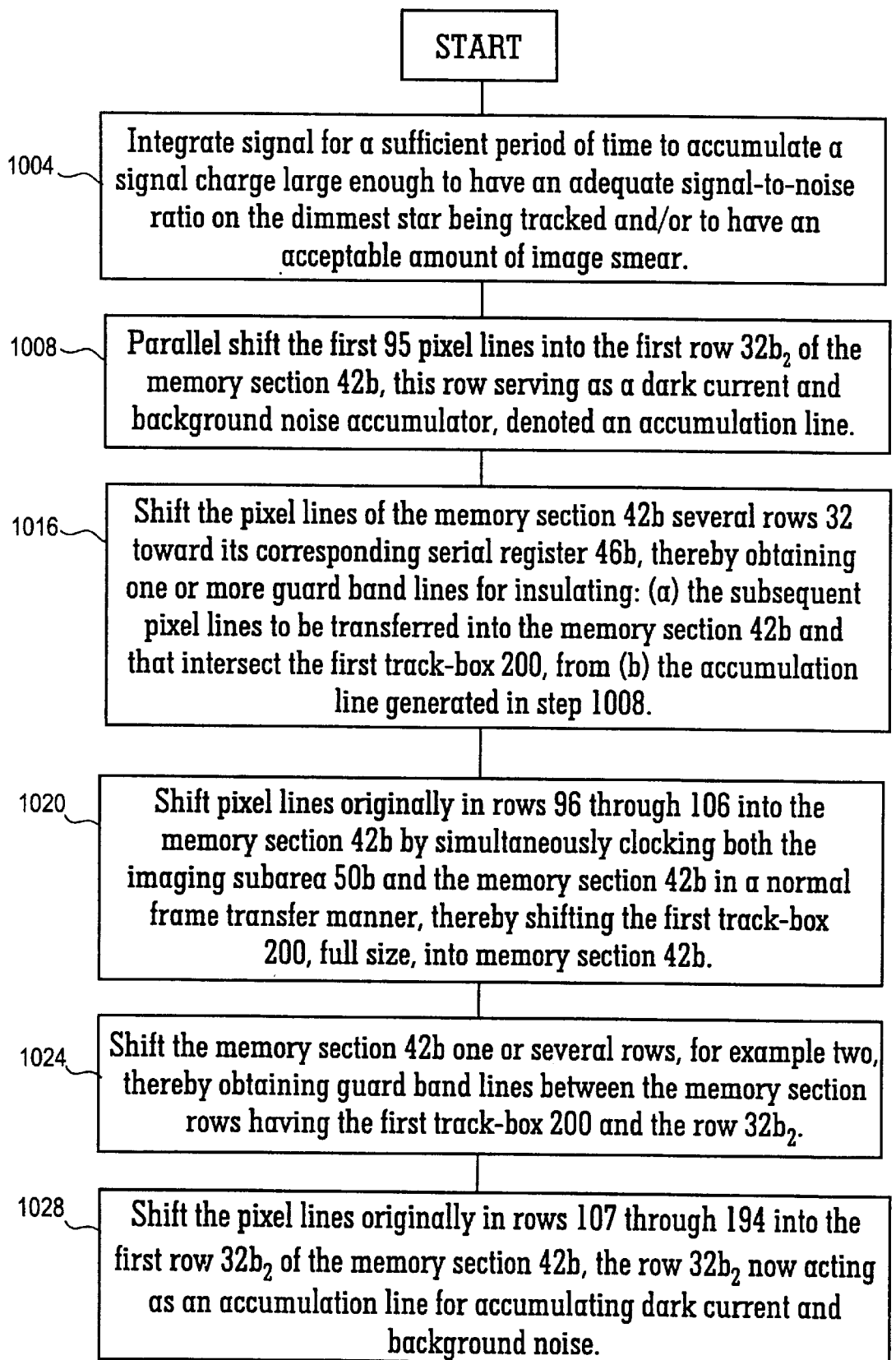
FIGS. 10A through 10C provide an exemplary flowchart illustrating the steps performed by the present invention during the tracking of two particular star images.
Figure 10B:
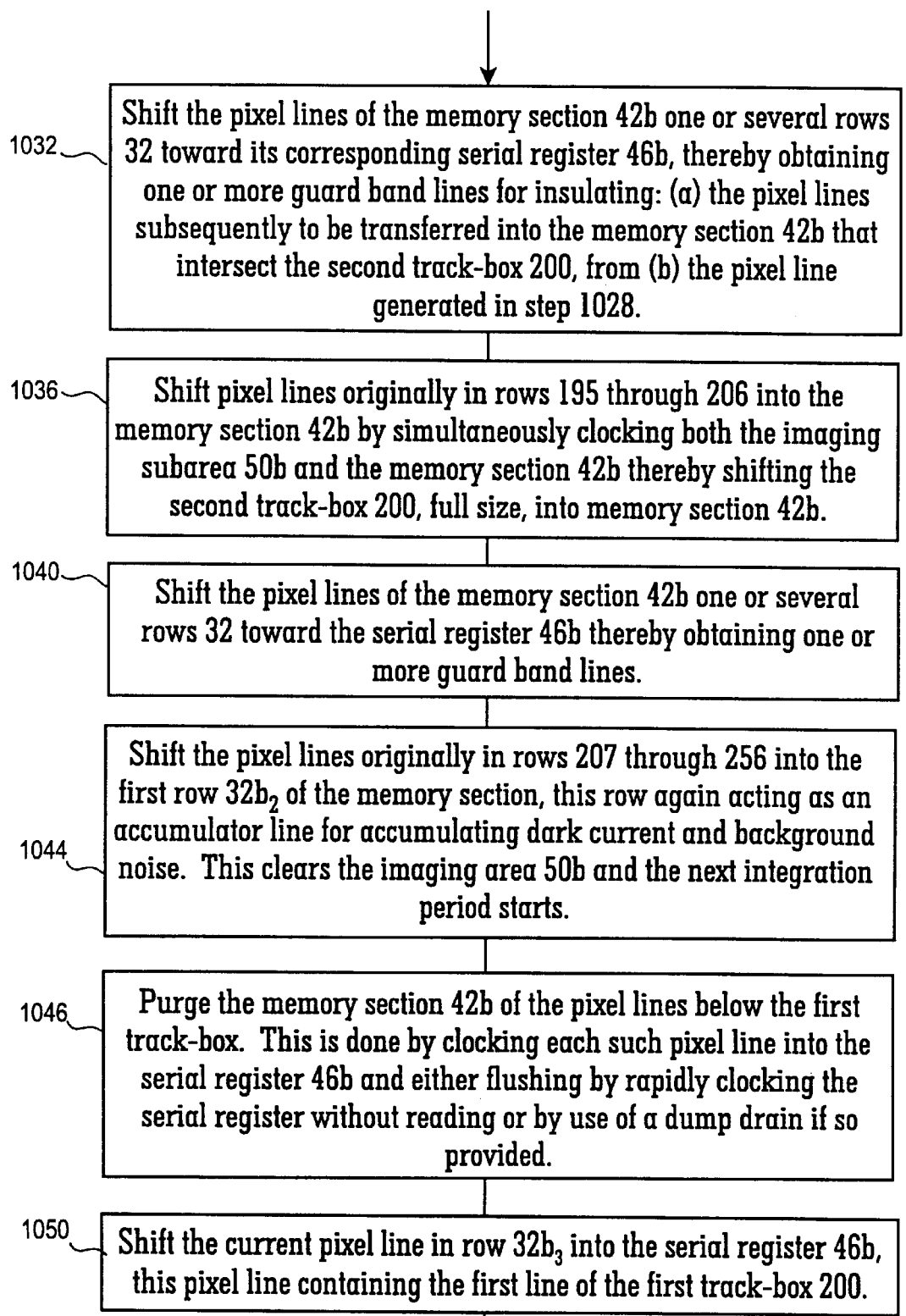
Figure 10C:
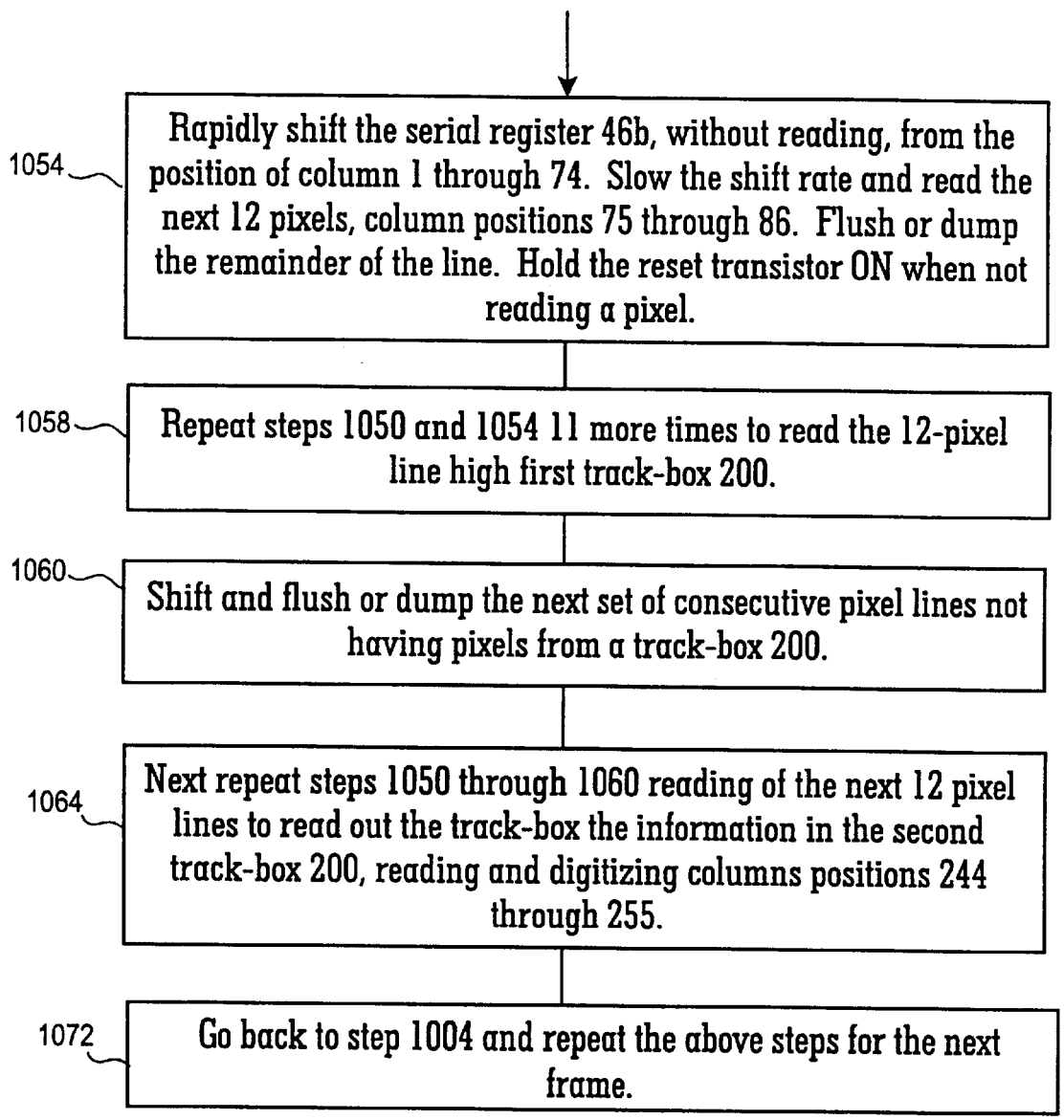

FIG. 9 illustrates a high level flowchart of the steps performed when pixel charges are transferred from one of the serial registers 46a and 46b through the respective one of the on-chip charge detection circuit 72a and 72b for either purging, or being subsequently processed by the centroid and prediction modules 88. In particular, in step 904, for a given one of the memory sections 42a and 42b (denoted MS), its corresponding serial register is denoted by the identifier SR. Subsequently, in step 908, any pixel lines in the memory section MS that do not include pixel charges from a track-box 200 are purged or dumped. Accordingly, upon completion of step 912, the serial register SR includes a pixel line that has track-box 200-data. Thus, in step 916, the time base generator 66 causes the serial register SR to rapidly shift into the extended portion 54 until the first track-box 200 data within the pixel line is available in the extended portion 54 for reading via a corresponding one of the on-chip charge detection circuits 72. Note that in one embodiment, when rapidly shifting the pixels in serial register SR, the corresponding on-chip charge detection circuit is configured to output such pixel charges to the drain 86. Alternatively, upon outputting of track-box 200 pixel charges from the extended portion 54, the corresponding on-chip charge detection circuit is configured to supply pixels) to the A/D converter 90 for digitizing amplitudes of the signals(step 920). The A/D converter 90 then outputs its digital data to the centroid and prediction modules 88 in step 924, and simultaneously, the time base generator 66 determines in decision step 928 whether there is an additional contiguous series of pixel charges within the serial register SR for another track-box 200. If so, then step 916 is again performed. Alternatively in the more typical case (where track-boxes do not have pixel lines in common), step 932 is performed wherein the remaining pixel charges in the serial register SR are flushed or dumped to the drain 86 and subsequently in decision step 936, the time base generator 66 determines whether there are additional pixel lines in the memory section MS that may include track-box 200 data. If so, then step 908 and subsequent steps are again iteratively processed to digitize the additional track-box 200 data and provide the digitized version thereof to the centroid and prediction modules 88. Alternatively, if all such pixel lines remaining in the memory section MS contain no track-box 200 data, then from the step 936, the process corresponding to FIG. 9 terminates and the flow of control returns to step 712 of FIG. 7.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for collecting location information for an object, comprising;
    obtaining location information that is used in determining a location of the object, said location information being obtained using a first number of lines of an image section of a charge coupled device;
    obtaining discardable information that is not used in determining the location of the object, said discardable information being obtained using a second number of lines of said image section of said charge coupled device;
    providing said location information and said discardable information to a memory section having a third number of lines, said third number of lines including a first set and a second set, said location information being provided to said first set and said discardable information being provided to said second set and in which said second set has a number of lines that is less than said second number of lines.

2. A method, as claimed in claim 1, wherein:
    said third number of lens is less than 50% of the total of said first number of lines and said second number of lines.

3. A method, as claimed in claim 1, wherein:
    said third number of lines is less than 75% of the total of said first number of lines and said second number of lines.

4. A method, as claimed in claim 1, wherein:
    said step of obtaining said location information includes defining at least a first track box comprising a subarray of said image section, said first track box including at least portions of some of said first number of lines.

5. A method, as claimed in claim 1, wherein:
    said step of providing said discardable information includes binning said discardable information into said second set and in which said second set includes one or more lines of said memory section.

6. A method, as claimed in claim 1, wherein:
    said step of providing said location information includes establishing at least a first guard line in said memory section before said step of providing said discardable information.

7. A method, as claimed in claim 1, further including:

receiving said location information in a serial register from said memory section, moving said location information into an extended portion in communication with said serial register and detecting pixel charges from said extended portion.

8. A method for collecting information related to a location of an object, comprising:

obtaining desirable information that is used in determining a location of an object and discardable information that is not used in determining said location of the object using a first number of lines of a charge coupled device; and providing said desirable information and said discardable information to a second number of lines of a memory section of said charge coupled device, with said second number of lines being less than said first number of lines.

9. A method, as claimed in claim 8, wherein:

said second number of lines is less than 50% of said first number of lines.

10. A method, as claimed in claim 8, wherein:

said desirable information includes one of location information related to a location of the object and acquisition information related to whether or not the object is present.

11. A method, as claimed in claim 8, wherein:

said first number of lines includes a third number of lines and a fourth number of lines, with said discardable information being obtained using said fourth number of lines, said second number of lines includes a fifth number of lines and a sixth number of lines, with said discardable information being provided to said sixth number of lines and said sixth number of lines being less than said fourth number of lines.

12. A method, as claimed in claim 8, wherein:

said desirable information includes acquisition information, said acquisition information is obtained from adjacent at least a first edge of said image section and said discardable information is obtained inwardly of said first edge.

13. A method, as claim in claim 8, wherein:

said desirable information includes acquisition information related to detecting a presence of the object and each of said first and second lines includes desirable information and discardable information.

14. A method, as claimed in claim 8, wherein:

said providing step includes producing a guard line in said memory section intermediate said desirable information and said discardable information.

15. A charge coupled device for providing information related to location of an object, comprising:

an image section including a first number of lines that has desirable information that is used in determining a location of an object, with said desirable information including acquisition information related to whether or not the object is present and discardable information that is not used in determining the location of the object;

a memory section in communication with said image section and including a second number of lines that is less than said first number of lines, said second number of lines receives said desirable information and said discardable information.

16. A charge coupled device, as claimed in claim 15, wherein:

said second number of lines is less than 50% of said first number of lines.

17. A charge coupled device for providing information related to location of an object, comprising:

an image section including a first number of lines that has desirable information that is used in determining a location of an object and discardable information that is not used in determining the location of the object; and a memory section including a second number of lines that is less than said first number of lines, said second number of lines for receiving said desirable information and said discardable information;

wherein said desirable information in said image section is present in a third number of lines and said discardable information is present in a fourth number of lines of said first number of lines and said desirable information is provided to said memory section in a fifth number of lines and said discardable information is provided to said memory section in a sixth number of one or more lines of said second number of lines, said sixth number of one or more lines being at least less than 50% of said fourth number of lines.

18. A charge coupled device, as claimed in claim 17, wherein:

said memory section includes at least a first guard line located intermediate said fifth number of lines and said sixth number of lines.

19. A charge coupled device for providing information related to location of an object, comprising:

an image section including a first number of lines that has desirable information that is used in determining a location of an object and discardable information that is not used in determining the location of the object, said desirable information being present adjacent to at least a first edge of said image section and said discardable information being located inwardly of said first edge; and a memory section including a second number of lines that is less than said first number of lines, said second number of lines for receiving said desirable information and said discardable information.

* * * * *